(12) United States Patent
Suwa et al.

(10) Patent No.: US 8,175,155 B2
(45) Date of Patent: May 8, 2012

(54) IMAGE PROCESSING APPARATUS, IMAGE PROCESSING METHOD, IMAGE PROCESSING PROGRAM, AND STORAGE MEDIUM

(75) Inventors: Tetsuya Suwa, Yokohama (JP); Fumihiro Goto, Kawasaki (JP); Masao Kato, Kawasaki (JP); Akitoshi Yamada, Yokohama (JP); Mitsuhiro Ono, Tokyo (JP); Fumitaka Goto, Tokyo (JP); Arata Miyagi, Kawasaki (JP); Yusuke Hashii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1319 days.

(21) Appl. No.: 11/767,592

(22) Filed: Jun. 25, 2007

(65) Prior Publication Data

US 2008/0002766 A1 Jan. 3, 2008

(30) Foreign Application Priority Data

Jun. 29, 2006 (JP) ................................. 2006-180377

(51) Int. Cl.
*H04N 7/24* (2006.01)
(52) U.S. Cl. ................................. 375/240.12
(58) Field of Classification Search .................. None
See application file for complete search history.

(56) References Cited

U.S. PATENT DOCUMENTS

| | | | |
|---|---|---|---|
| 4,577,235 A | 3/1986 | Kannapell et al. | 358/280 |
| 4,893,188 A | 1/1990 | Murakami et al. | 358/456 |
| 5,045,952 A | 9/1991 | Eschbach | 358/447 |
| 5,087,972 A | 2/1992 | Sumi | 358/166 |
| 5,315,382 A * | 5/1994 | Tanioka | 358/523 |
| 5,394,250 A * | 2/1995 | Shono | 358/3.03 |
| 5,572,607 A | 11/1996 | Behrends | |
| 5,585,944 A | 12/1996 | Rodriguez | 358/500 |
| 5,598,482 A | 1/1997 | Balasubramanian et al. | |
| 5,621,868 A | 4/1997 | Mizutani et al. | 395/131 |
| 5,701,364 A | 12/1997 | Kanno | 382/176 |
| 5,717,789 A | 2/1998 | Anderson et al. | |
| 5,778,158 A | 7/1998 | Fujii et al. | |
| 5,914,731 A | 6/1999 | Yano et al. | 347/9 |
| 5,960,109 A | 9/1999 | Shiau | 382/164 |
| 6,075,894 A | 6/2000 | Yano et al. | 382/199 |

(Continued)

FOREIGN PATENT DOCUMENTS

EP 0 415 648 A2 3/1991

(Continued)

OTHER PUBLICATIONS

European Communication and Search Report dated Sep. 20, 2007, regarding Application No. 07011787.4-1522.

*Primary Examiner* — Kaveh Abrishamkar
(74) *Attorney, Agent, or Firm* — Fitzpatrick, Cella, Harper & Scinto

(57) ABSTRACT

There is disclosed an image processing apparatus which determines an attribute of an image including a pixel to be processed. An image area having a predetermined size including the pixel to be processed is extracted (S701). A variation related to the image area is calculated based on pixel values included in the image area (S705). Pixels in the image area are converted into N-ary data (ternary data or higher) in accordance with the calculated variation (S709). The attribute of the pixel to be processed is determined by analyzing the N-ary data as a result of the N-ary conversion (S711).

15 Claims, 25 Drawing Sheets

U.S. PATENT DOCUMENTS

| | | | |
|---|---|---|---|
| 6,075,926 A | 6/2000 | Atkins et al. | |
| 6,191,874 B1 | 2/2001 | Yamada et al. | 358/529 |
| 6,243,070 B1 | 6/2001 | Hill et al. | 345/136 |
| 6,292,621 B1 | 9/2001 | Tanaka et al. | 386/56 |
| 6,480,624 B1 | 11/2002 | Horie et al. | 382/165 |
| 6,608,926 B1 | 8/2003 | Suwa et al. | 382/162 |
| 6,636,644 B1 | 10/2003 | Itokawa | 382/243 |
| 6,636,646 B1 | 10/2003 | Gindale | 382/274 |
| 6,694,051 B1 | 2/2004 | Yamazoe et al. | 382/167 |
| 6,714,689 B1 | 3/2004 | Yano et al. | 382/284 |
| 6,856,704 B1 | 2/2005 | Gallagher et al. | 382/263 |
| 6,934,412 B2 | 8/2005 | Bares | 382/165 |
| 7,075,679 B2 | 7/2006 | Goto et al. | 358/3.01 |
| 7,274,491 B2 | 9/2007 | Yamada et al. | 358/3.06 |
| 7,280,703 B2 | 10/2007 | Gallagher et al. | 382/260 |
| 7,289,154 B2 | 10/2007 | Gindele | 348/364 |
| 7,308,137 B2 | 12/2007 | Hsieh et al. | 382/170 |
| 7,426,312 B2 | 9/2008 | Dance et al. | 382/254 |
| 7,466,319 B1 | 12/2008 | Kirkland et al. | 345/589 |
| 7,570,810 B2 | 8/2009 | Rai et al. | 382/167 |
| 7,684,617 B2 | 3/2010 | Yoshiura | 382/167 |
| 7,746,503 B2 | 6/2010 | Lim | 358/3.27 |
| 2003/0160875 A1 | 8/2003 | Mitsunaga | 348/222.1 |
| 2003/0179299 A1 | 9/2003 | Okada | 348/222.1 |
| 2003/0193679 A1* | 10/2003 | Iwasaki et al. | 358/1.9 |
| 2004/0196408 A1 | 10/2004 | Ishikawa et al. | 348/616 |
| 2005/0134892 A1 | 6/2005 | Goto et al. | 358/1.13 |
| 2006/0012693 A1 | 1/2006 | Sambongi | 348/241 |
| 2008/0002216 A1 | 1/2008 | Matsushima | 358/1.9 |
| 2008/0002766 A1 | 1/2008 | Suwa et al. | 375/240.12 |
| 2008/0002901 A1 | 1/2008 | Miyagi et al. | 382/260 |
| 2008/0002998 A1 | 1/2008 | Goto et al. | 399/39 |
| 2008/0007785 A1 | 1/2008 | Hashii et al. | 358/3.01 |
| 2008/0018938 A1 | 1/2008 | Lee | 358/3.06 |
| 2008/0123151 A1 | 5/2008 | Goto et al. | 358/3.27 |

FOREIGN PATENT DOCUMENTS

| | | |
|---|---|---|
| EP | 0 871 323 A2 | 10/1998 |
| EP | 0 898 414 A2 | 2/1999 |
| EP | 1 065 881 A1 | 1/2001 |
| JP | 2620368 | 3/1997 |
| JP | 3215768 | 7/2001 |
| JP | 2002-77623 | 3/2002 |

* cited by examiner

F I G. 1B
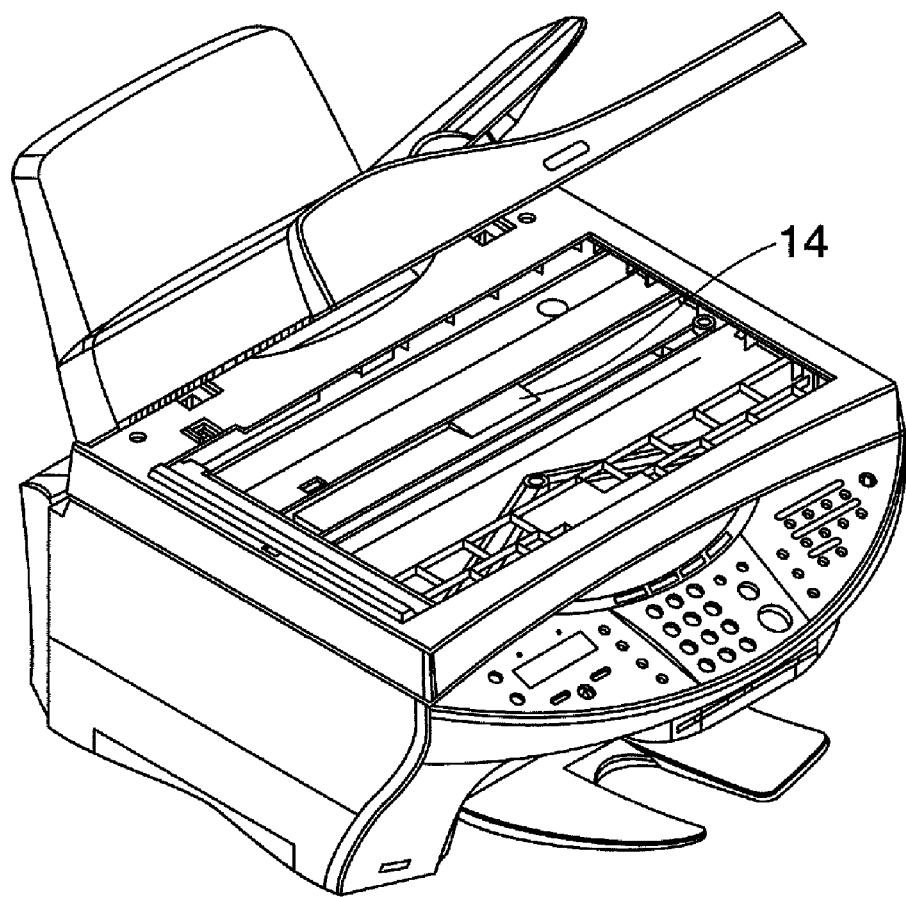

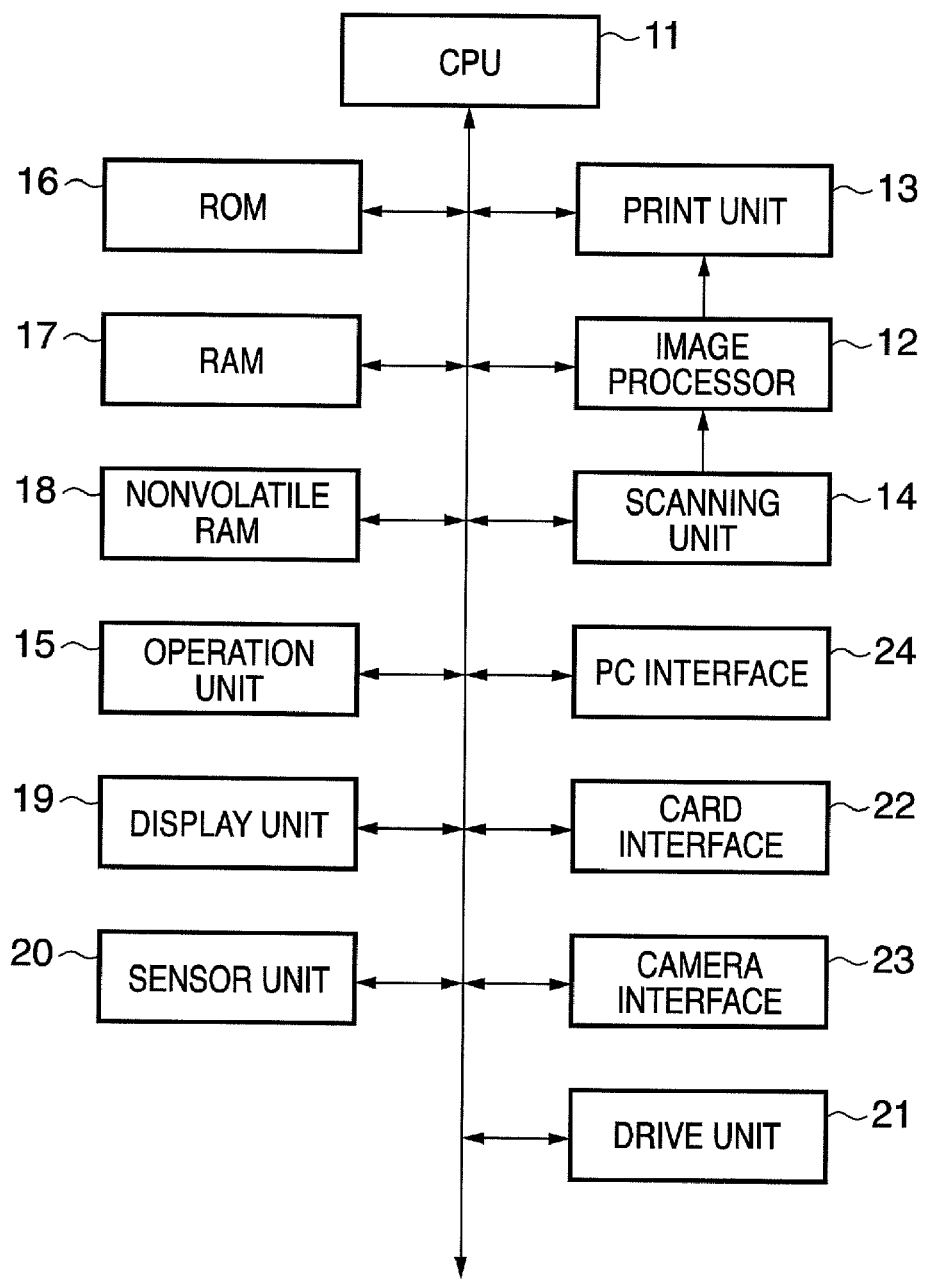

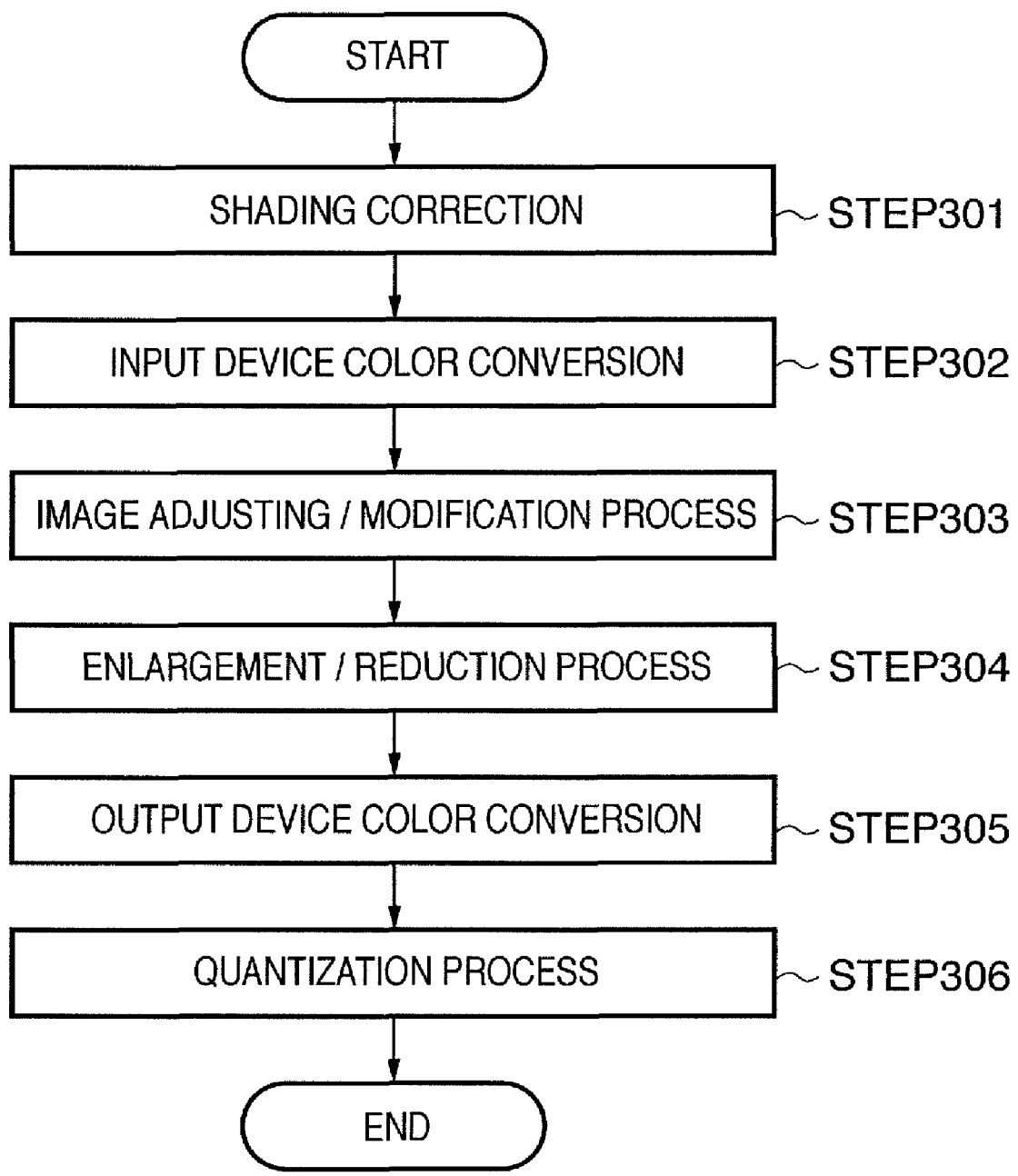

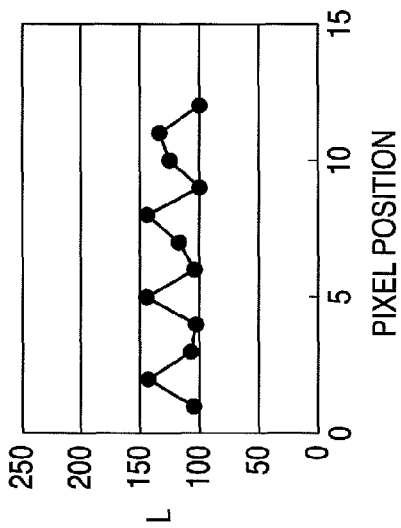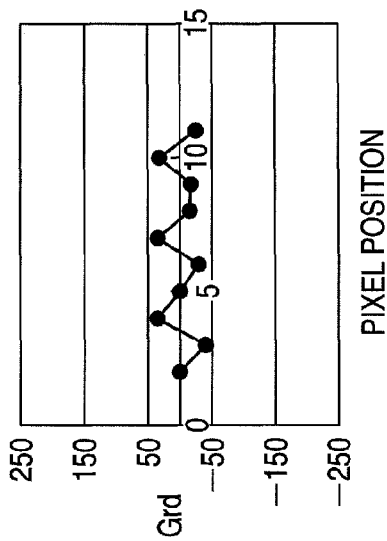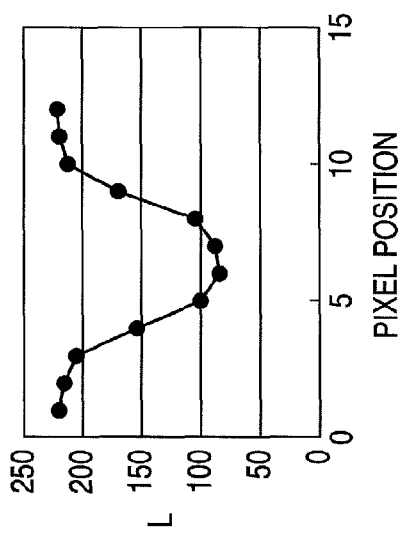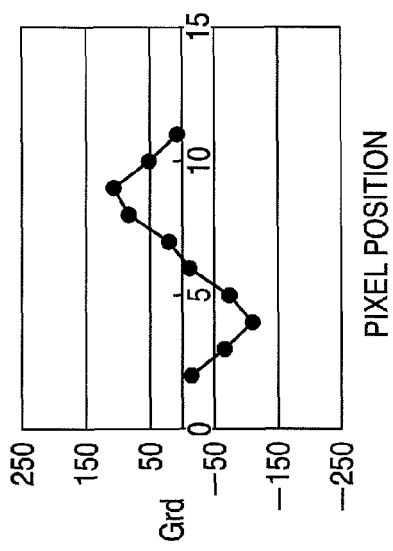

FIG. 14A

| -6 | -14 | -16 | -14 | -6 |
|---|---|---|---|---|
| -14 | 8 | 44 | 8 | -14 |
| -16 | 44 | 120 | 44 | -16 |
| -14 | 8 | 44 | 8 | -14 |
| -6 | -14 | -16 | -14 | -6 |

FIG. 14B

| -6 | -14 | -16 | -14 | -6 |
|---|---|---|---|---|
| -14 | 8 | 44 | 8 | -14 |
| -16 | 44 | -8 | 44 | -16 |
| -14 | 8 | 44 | 8 | -14 |
| -6 | -14 | -16 | -14 | -6 |

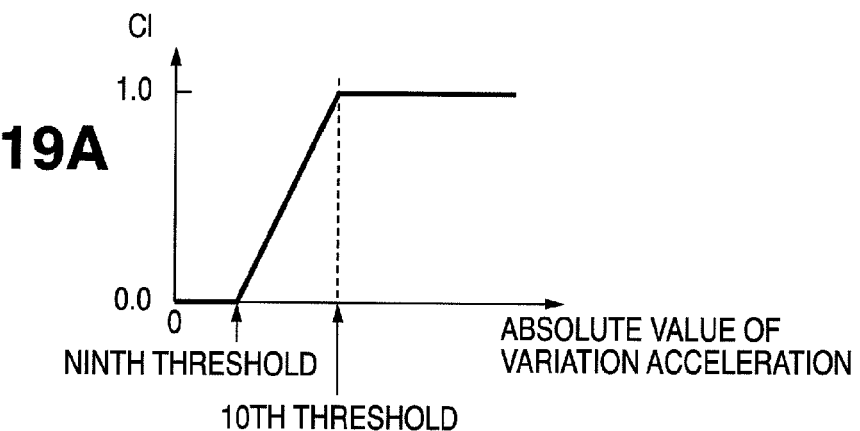
F I G. 19A
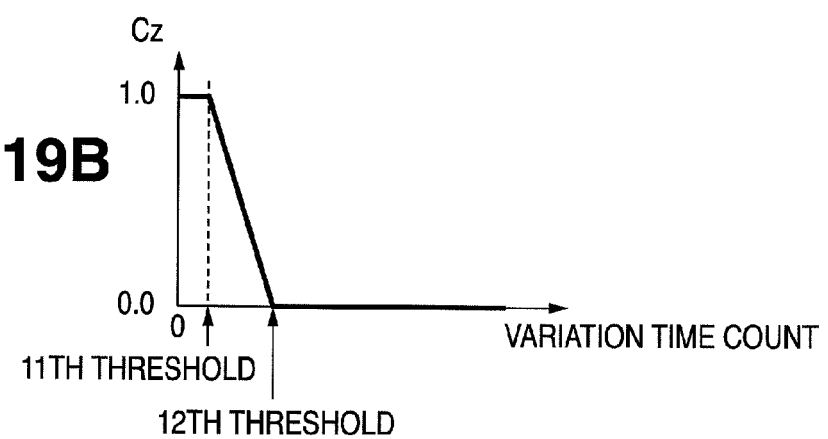
F I G. 19B
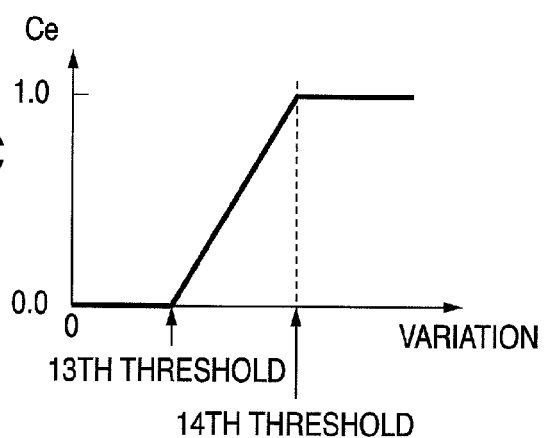
F I G. 19C

F I G. 22
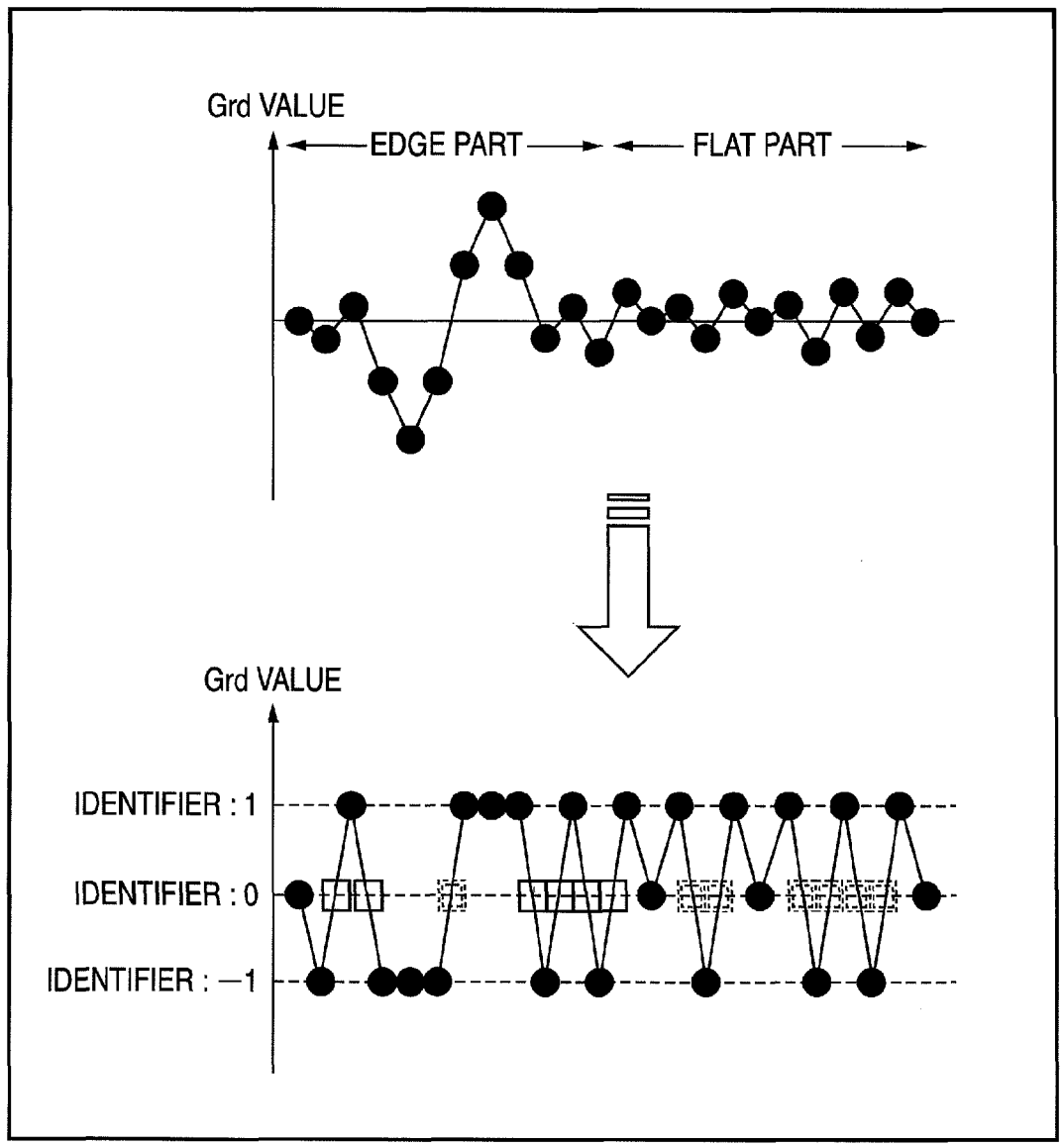

IMAGE PROCESSING APPARATUS, IMAGE PROCESSING METHOD, IMAGE PROCESSING PROGRAM, AND STORAGE MEDIUM

BACKGROUND OF THE INVENTION

1. Field of the Invention

The present invention relates to an image processing apparatus, image processing method, image processing program, and storage medium for determining attributes of an image.

2. Description of the Related Art

Conventionally, image forming apparatuses have elaborated various means up to the present date to obtain higher-quality images. One such means is an optimization process based on image types. A document includes various image types such as "text", "photo", and the like, and often includes a combination of these image types. For this reason, image reproduction that maintains tonality is required for a photo area, while a process for reclaiming edges that have deteriorated due to Modulation Transfer Function (MTF) characteristics upon scanning is required for a text area.

Area determination accuracy in image area separation is important due to the assumption of such optimization processing. If this accuracy is poor and appropriate area designation is not possible, a suitable process will not be applied, and a good output result will likely not be obtained. The journal of the IEICE '87/2 Vol. J70-B No. 2 presented "Block Separate Transformation Method: BSET Method", which separates three areas—photo, text, and halftone areas—based on a density change in a block. In this method, a photo area is determined using the characteristic that density change therein is small; text and halftone areas are determined using the characteristic that text areas have a larger period of density change than halftone areas. More specifically, photo areas are determined based on the difference between the minimum and maximum densities in a predetermined block, and text and halftone areas are distinguished based on a count of change over time when digitizing densities in a block using an average signal value.

Japanese Patent No. 03215768 discloses an image area separation method using a runlength after binarization. With this method, an image is binarized to calculate a maximum runlength, and at the same time, when a predetermined condition is met, black pixels are expanded to calculate its maximum runlength. The difference between these runlengths is compared with a threshold, and if the difference is larger, the area is determined to be a halftone area; otherwise, the area is determined to be a text area. As described in this patent, a photo area can be extracted through simultaneous use of the aforementioned BSET method.

With the technique disclosed in the above reference, data (0/1) obtained by binarizing image signal values within a predetermined range are generated, and halftone and text areas are separated by reading the change time count of 0 and 1 in the binary data. More specifically, as in the following inequalities, let $KH01$ be the change time count of 0 and 1 in the main scan direction of the predetermined range, and $KV01$ be that in the sub-scan direction. Then, by comparing these change time counts with a threshold TL, a halftone or text area is determined.

$KH01 \geqq TL$ and $KV01 \geqq TL$ . . . halftone area $KH01 < TL$ and $KV01 < TL$ . . . text area However, upon actual image scanning, image signal values include variations due to noise of a light source, errors of CCD sensor sensitivity, and nonuniformity of a document itself to be scanned. By contrast, in the method of calculating the change time counts $KH01$ and $KV01$ using binary data, the binary data is vulnerable to measurement errors, and its reliability lowers. As a result, it becomes difficult to discriminate halftone and text areas with sufficient accuracy. Therefore, an image process using the conventional image area separation method, for example, an edge emphasis process of a text area using a filter does not emphasize edges even for a text area, emphasizes edges for a halftone area, and worsens blurring and moiré of characters.

The present invention has been made to solve the problems of the prior arts, and enables more accurate determination of attributes of images.

SUMMARY OF THE INVENTION

The present invention enables more accurate determination of attributes of images.

According to the present invention, the foregoing problem is solved by providing an image processing apparatus, which determines an attribute of an image including a pixel to be processed, said apparatus comprising:

an extracting unit arranged to extract an image area having a predetermined size including the pixel to be processed;

a variation calculation unit arranged to calculate a variation related to the pixel to be processed from pixel values included in the image region;

an N-ary conversion unit arranged to convert pixels in the image area into N-ary data (ternary data or higher) using a threshold according to the calculated variation; and a determination unit arranged to determine an attribute of the pixel to be processed by analyzing the N-ary data as a result of the N-ary conversion.

According to the present invention, the foregoing problem is solved by providing an image processing method, which determines an attribute of an image including a pixel to be processed, the method comprising the steps of:

extracting an image area having a predetermined size including the pixel to be processed;

calculating a variation related to the pixel to be processed from pixel values included in the image region;

deciding a first threshold and a second threshold according to the calculated variation;

converting pixels in the image area into N-ary data (ternary data or higher) using the decided first threshold and second threshold; and determining an attribute of the pixel to be processed by analyzing the N-ary data as a result of the N-ary conversion.

According to the present invention, the foregoing problem is solved by providing an image processing program, which determines an attribute of an image including a pixel to be processed, an image processing apparatus executing the image processing program to implement the steps of:

extracting an image area having a predetermined size including the pixel to be processed;

calculating a variation related to the pixel to be processed from pixel values included in the image region;

deciding a first threshold and a second threshold according to the calculated variation;

converting pixels in the image area into N-ary data (ternary data or higher) using the decided first threshold and second threshold; and determining an attribute of the pixel to be processed by analyzing the N-ary data as a result of the N-ary conversion.

Further features of the present invention will become apparent from the following description of exemplary embodiments with reference to the attached drawings.

BRIEF DESCRIPTION OF THE DRAWINGS

FIGS. 1A and 1B are explanatory views of an MFP;

FIG. 2 is a block diagram for explaining the control arrangement of the MFP;

FIG. 3 is a flowchart of an image process of the MFP;

FIGS. 8A to 8H are graphs for explaining the luminance, and primary derivative, ternarization process, and secondary derivative;

FIGS. 14A and 14B are explanatory views of edge emphasis filter coefficients;

FIGS. 19A to 19C are graphs for explaining a substitute level defining process;

FIG. 22 is a view showing a variation time count when a zero certifying width W is not used (when the zero certifying width W is defined to be zero)

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment (Arrangement of MFP)

Figure 1A:
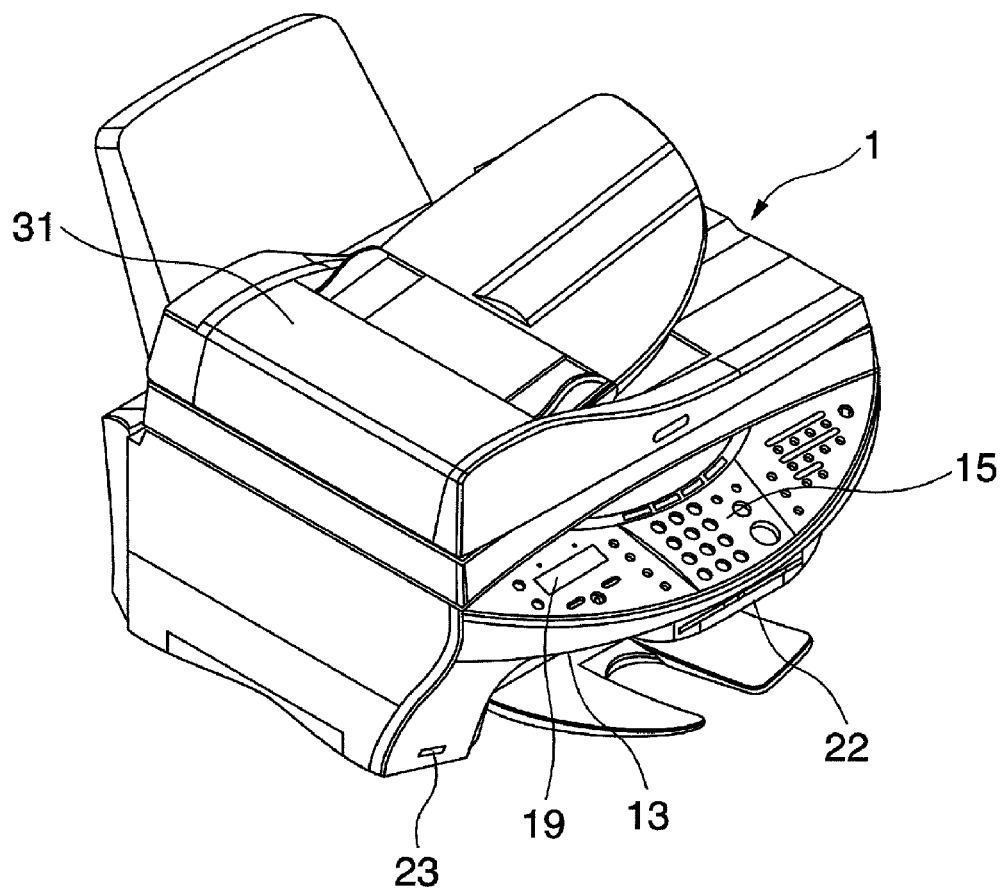

FIGS. 1A and 1B are schematic perspective views of a multi function printer (to be abbreviated as MFP hereinafter) 1 according to one embodiment of the present invention. FIG. 1A shows a state in which an ADF (auto document feeder) 31 of the MFP 1 is closed, and FIG. 1B shows a state in which the ADF 31 is open.

This MFP 1 basically has a function of printing data received from a host computer (PC) as a printer, and a function as a scanner. Furthermore, functions of the MEP alone include a copy function of printing an image scanned by the scanner using the printer, a function of printing image data read from a storage medium such as a memory card or the like, and a function of printing image data received from a digital camera or the like.

Referring to FIGS. 1A and 1B, the MFP 1 comprises a scanning unit 14 such as a flatbed scanner or the like, and a print unit 13 of an ink-jet system, electrophotography system, or the like. Also, the MFP 1 comprises a display unit 19 such as a display panel or the like, and an operation unit 15 including various key switches, and the like. The MFP 1 comprises a USB port (not shown) used to communicate with the PC on its back surface of the MFP 1, and the USB port allows the MFP 1 to communicate with the PC. The MFP 1 comprises a card interface 22 including a card slot used to read out data from various memory cards, and a camera interface 23 including a camera port used to make data communications with a digital camera. In addition, the MFP 1 comprises the ADF 31 used to automatically set a document on a document table.

FIG. 2 is a block diagram showing the internal arrangement of the MFP 1. Referring to FIG. 2, a CPU 11 controls various functions of the MFP 1, and executes image process programs stored in a ROM 16 in accordance with predetermined operations at the operation unit 15. By executing the programs, the CPU 11 can select a pixel to be processed, and can extract an image area with a predetermined size including the pixel to be processed. The CPU 11 can calculate a variation, variation time count, variation acceleration, and saturation associated with the pixel to be processed based on signal values of pixels included in the image area. Furthermore, the CPU 11 can determine the attributes of pixels in the image area by converting pixels into N-ary data (ternary data or higher) and analyzing the N-ary data. The ROM 16 stores various tables and mathematical formulas used in image processes, and defines correspondence between a variation and first and second thresholds. The scanning unit 14 which comprises a CCD scans a document image, and outputs red (R), green (G), and blue (B) analog luminance data. Note that the scanning unit 14 may comprise a contact image sensor (CIS) in place of the CCD. Also, when the MFP 1 comprises the ADF 31, it is convenient to continuously scan order sheets.

The card interface 22 loads image data, which is captured by, for example, a digital still camera (to be abbreviated as DSC hereinafter) and is recorded on a memory card or the like, in accordance with operations at the operation unit 15. Note that the color space of the image data loaded via the card interface 22 is converted from that of the DSC (e.g., YCbCr) into a standard RGB color space (e.g., NTSC-RGB or sRGB) if necessary. The loaded image data undergoes various kinds of processes required for an application such as resolution conversion to the effective number of pixels, and the like, based on its header information. The camera interface 23 is used to directly connect the DSC and to read image data.

An image processor 12 executes image processes such as conversion of a read signal value, an image adjusting/modification process, conversion from luminance signals (RGB) into density signals (CMYK), scaling, gamma conversion, error diffusion, and the like. The adjusting process to be executed by the image processor 12 includes an edge emphasis process, smoothing process, substitution process, achromatization process, and the like, and the image processor 12 serves as an adjusting unit. Data obtained by the image processes in the image processor 12 is stored in a RAM 17. When adjusted data stored in the RAM 17 reaches a predetermined amount, the print unit 13 executes a print operation.

A nonvolatile RAM 18 comprises, for example, a battery backed-up SRAM or the like, and stores data unique to the MFP 1 or the like. The operation unit 15 comprises a photo direct print start key which allows the user to select image data stored in a storage medium (memory card) and to start printing. The operation unit 15 also comprises a key used to print an order sheet, a key used to scan an order sheet, and the like. The operation unit 15 may also comprise a copy start key in a monochrome copy mode or color copy mode, a mode key used to designate a mode such as a copy resolution, image quality, and the like, a stop key used to stop a copy operation or the like, a numerical keypad used to input a copy count, a registration key, and the like. The CPU 11 detects the pressing states of these keys and controls respective units according to the detected states.

The display unit 19 comprises a dot matrix type liquid crystal display unit (LCD) and an LCD driver, and makes various displays under the control of the CPU 11. Also, the display unit 19 displays thumbnails of image data recorded in a storage medium. The print unit 13 comprises an ink-jet head of an ink-jet system, general-purpose IC, and the like. The print unit 13 reads out print data stored in the RAM 17 and prints it out as a hard copy under the control of the CPU 11.

A drive unit 21 includes stepping motors for driving feed and discharge rollers, gears for transmitting the driving forces of the stepping motors, a driver circuit for controlling the stepping motors, and the like in order to operate the scanning unit 14 and print unit 15.

A sensor unit 20 includes a print sheet width sensor, print sheet sensor, document width sensor, document sensor, print medium sensor, and the like. The CPU 11 detects the states of a document and print sheet based on information obtained from this sensor unit 20.

A PC interface 24 is an interface with the PC, and the MFP 1 performs a print operation, scan operation, and the like from the PC via the PC interface 24. In a copy operation, image data scanned by the scanning unit 14 undergoes a data process inside the MFP, and is printed using the print unit 13.

Upon instruction of a copy operation from the operation unit 15, the scanning unit 14 scans a document set on the document table. The scanned data is sent to the image processor 12 and undergoes the image process. Then, the processed data is sent to the print unit 13, thus executing a print process.

(Image Process)

FIG. 3 is a flowchart of the image process executed in a copy mode. Respective steps will be described below. The CPU 11 applies shading correction to image data, which is scanned by the scanning unit 14 and is A/D-converted, so as to adjust variations of an image sensing element in STEP 301.

After that, the CPU 11 executes input device color conversion in STEP 302. As a result, the device-dependent color space of signal data is converted into a standard color space domain. For example, the standard color space includes sRGB specified by IEC (International Electrotechnical Commission), AdobeRGB propounded by Adobe Systems, and the like. The conversion method includes an arithmetic method using a 3×3 or 3×9 matrix, a lookup table method which determines values based on a table that describes conversion rules, and the like.

In STEP 303, the CPU 11 applies an adjusting/modification process to the converted data. The process contents include an edge emphasis process that adjusts blurring due to scanning, a text modification process that improves legibility of text, a process for removing bleed-through that has occurred due to scanning upon light irradiation, and the like.

In STEP 304, the CPU 11 executes an enlargement/reduction process to convert the data to a desired scale when the user designates a zoom scale, in a 2-in-1 copy mode that assigns two document images on one sheet, or the like. As the conversion method, methods such as a bicubic method, nearest neighbor method, and the like are generally used.

In STEP 305, the CPU 11 converts the data on the standard color space into signal data unique to an output device. The MFP according to this embodiment adopts an ink-jet system, and executes a conversion process into ink color data such as cyan, magenta, yellow, black, and the like. This conversion can use the same method as in STEP 302.

Furthermore, in STEP 306 the CPU 11 converts the data into the number of printable levels. For example, in the case of binary expression, that is, ON/OFF of ink dots, the data may be binarized by a quantization method such as error diffusion or the like. As a result, the data is converted into a data format that the printer can print, and a print operation is executed based on that data, thus forming an image.

(Process Unit)

Figure 4A:
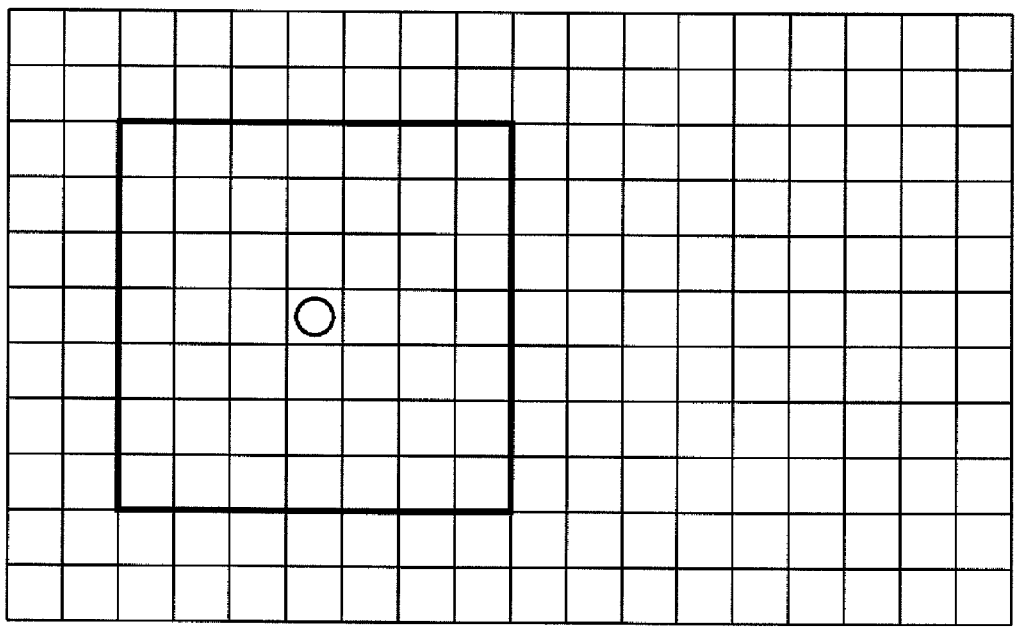
FIGS. 4A and 4B are explanatory views of a process unit.
Figure 4B:
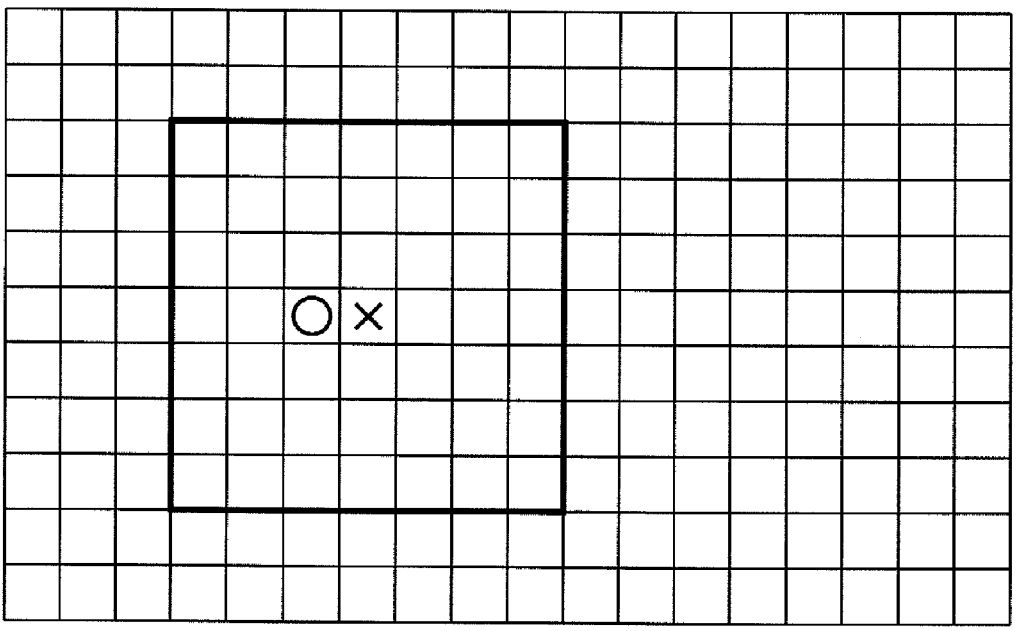

FIG. 4A is a view for explaining a process unit upon execution of an attribute determination process. Assuming that a pixel indicated by "○" in FIG. 4A is a pixel of interest, an area defined by 7×7 pixels including the pixel of interest (7×7 area) is defined, as indicated by the bold line in FIG. 4A. An image process for the pixel of interest is executed using image signals in this defined 7×7 area. After execution of the process of the pixel of interest, a pixel that neighbors the pixel of interest is defined as the next pixel of interest, as indicated by "×" in, for example, FIG. 4B, and a 7×7 area is similarly defined to execute the image process. After that, the pixel of interest is similarly shifted pixel by pixel in turn and a new 7×7 area is defined in each case, thus adjusting all pixels to be processed.

Figure 5:
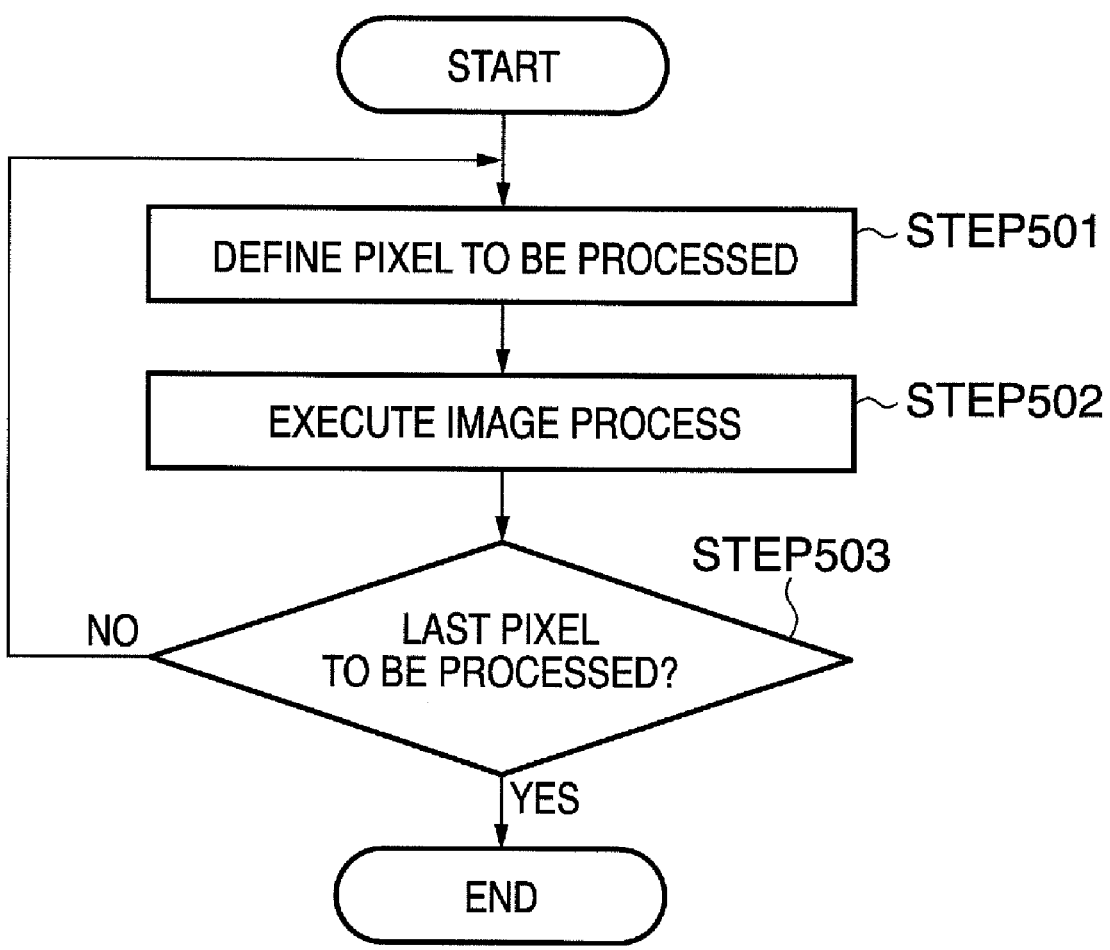
FIG. 5 is a flowchart of a shift process of a process unit.

FIG. 5 is a flowchart showing a shift process of a unit area of the attribute determination process. In STEP 501, the CPU 11 defines a process target (pixel to be processed). Immediately after START, the CPU 11 defines a first pixel to be processed. If the process returns from STEP 503 to STEP 501, the CPU 11 defines the next pixel to be processed.

In STEP 502, the CPU 11 executes the image process. That is, the CPU 11 defines a plurality of pixels (e.g., a 7×7 area) including the pixel to be processed, and executes the attribute determination process.

The CPU 11 checks in STEP 502 if the last pixel to be processed is defined. If the pixel to be processed is not the last one (NO), the process returns to STEP 501. If the last pixel to be processed is defined (YES), the process ends.

One pixel of the image sensing element of the CCD or CIS used in the scanning unit 14 does not always scan one pixel or the equivalent of a document. This embodiment assumes a case in which one pixel of the image sensing element scans a range of approximately six pixels of a document. Although the range of six pixels is assumed, reflected light from a document that enters the image sensing element receives various influences due to float of a document from the document table, unevenness of a document, and the like. For this reason, one pixel of the image sensing element may scan a range exceeding six pixels in practice. Reflected light of one pixel of a document influences a plurality of pixels of the image sensing element, causes edge blurring described in the paragraphs of the related art, and deteriorates sharpness. This embodiment uses a 7×7 reference area since the range of approximately six pixels is scanned. Note that the reference range may be defined as needed in accordance with the number of pixels of the image sensing element influenced by one pixel of a document image, the spot size, the number of blurred pixels, and the performance of the image sensing element such as MTF or the like.

(Definition of Terms)

Terms used in the present specification will be defined below.

A variation is a value that represents the magnitude of the variations of pixel signal values in a surrounding pixel group having a pixel to be processed as the center. In this embodiment, of the absolute values (edge amounts) of differences between luminance values of two pixels that neighbor one pixel on two sides, a maximum one-will be explained as the variation. However, the present invention is not limited to such specific value. For example, the variation may be a value that expresses the difference (magnitude) of changes such as the absolute value of the primary derivative of a value related to an image signal of a pixel of interest or the like, or a value that representatively expresses the difference (magnitude) of changes of values related to image signals in an area of interest.

A variation time count is a value that represents the frequency of occurrence of variations of image signal values in a surrounding pixel group having the pixel to be processed as the center. In this embodiment, the difference between the luminance values of two pixels that neighbor one pixel on two sides in the image area is ternarized using −1, 0, and 1, and the frequency of occurrence of increment/decrement of ternary data (the number of sign changes (the number of zero-crossing points)) will be described as the variation time count. However, the present invention is not limited to such specific value. The variation time count is defined as a value that expresses the frequency of occurrence of changes in value associated with image signals such as the number of zero-crossing points or spatial frequency of the primary derivatives of values associated with image signals in the image area, a black-white change count after binarization, and the like.

A variation acceleration is a value that represents the acceleration of variations of pixel signal values in a surrounding pixel group having the pixel to be processed as the center. In the following embodiments, the variation acceleration will be explained as a value obtained by further calculating a difference from the differences of luminance values in the image area. However, the present invention is not limited to such specific value. For example, the acceleration variation may be a value that expresses the acceleration of changes such as the secondary derivative of values associated with image signals in an area of interest and the like.

A saturation will be explained as a maximum absolute value of image signal differences of respective colors of a pixel or area of interest in the following embodiments. However, the present invention is not limited to such specific value. The saturation is defined as a value that expresses the distance from the chromaticity axis.

Adaptively defining an adjusting level is defined such that different adjusting levels are defined for each value in at least some value areas of those which the defined variation time count, variation, variation acceleration, and saturation can assume.

Attribute determination indicates an attribute of the pixel of interest, and is defined as one of "photo", "text", "line", "halftone", and the like. The attribute determination can be synonymous with an image area separation process.

Note that a range from 0 to 255 that an image signal can assume will be exemplified. However, the range of the image signal is not limited to such a specific one, and it may be defined to fit in the MFP or image process.

(Attribute Determination Process)

Figure 7:
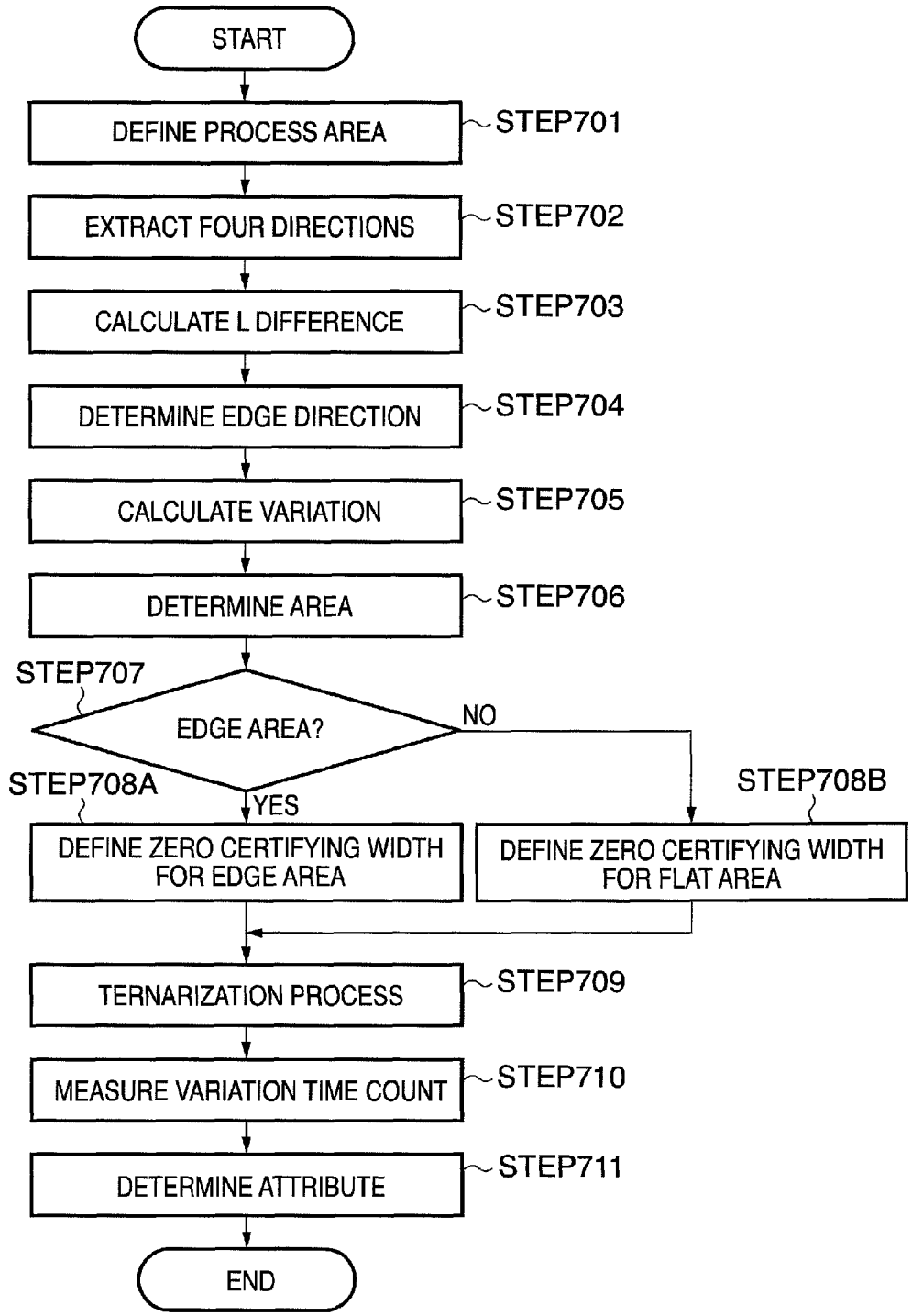
FIG. 7 is a flowchart of attribute determination of the first embodiment.

FIG. 7 is a flowchart of the attribute determination process of this embodiment. It is desired to execute this attribute determination process as a part of STEP 303 in FIG. 3. A description will be given along respective steps in FIG. 7.

<STEP 701: Define Process Area>

The CPU 11 defines a process area, that is, a 7×7 area including seven pixels in the horizontal direction and seven pixels in the vertical direction to have the pixel of interest as the center in an image configured by RGB multi-valued image signals, and generates a 7×7 process area of luminance L by calculating luminance L from respective pixel values of the process area by:

$$L=(R+2\times G+B)/4 \qquad (1)$$

Note that this embodiment uses luminance L given by equation (1), but may adapt another luminance. For example, L* of a uniform color space L*a*b* may be used as a luminance, or Y of YCbCr may be used as a luminance.

Figure 8E:
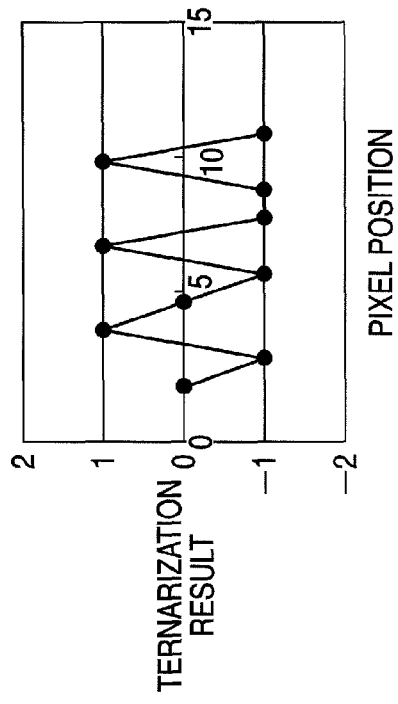

FIG. 8A shows luminance values upon scanning a black vertical line in a white background in the horizontal direction. FIG. 8B shows luminance values upon scanning, in the horizontal direction, halftone dots that line up in the horizontal direction in a white background. For the sake of easy understanding, FIGS. 8A to 8H use 12 pixels in place of seven pixels.

<STEP 702: Extract Four Directions>

Figure 9:
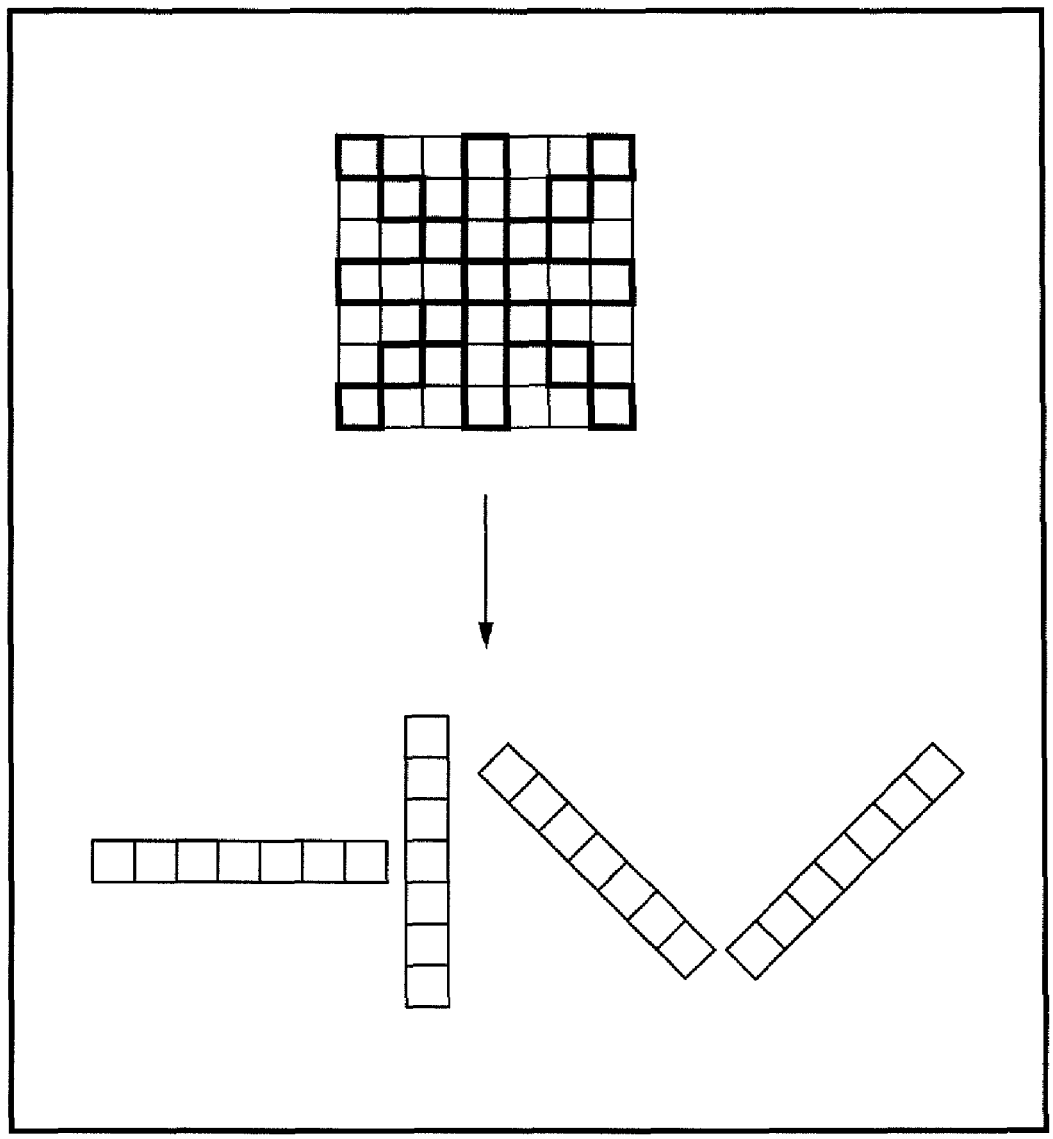
FIG. 9 is an explanatory view of 4-direction extraction.

The CPU 11 extracts, from the process area of L generated in STEP 701, seven pixels in each of a total of four directions, that is, one horizontal direction, one vertical direction, and two oblique directions, as shown in FIG. 9.

<STEP 703: Calculate L Difference>

The CPU 11 calculates differences Grd of L of five pixels in each direction from L in the four directions extracted in STEP 702 by:

$$Grd(i)=L(i+1)-L(i-1) \qquad (2)$$

where L(i−1) is a pixel before pixel L(i), and L(i+1) is a pixel after pixel L(i).

Note that the L difference calculation method is not limited to such specific method. For example, differences between neighboring pixels may be calculated, or differences between pixels further separated from those before and after a given pixel may be calculated. FIGS. 8C and 8D show Grd calculated by applying equation (2) to L in FIGS. 8A and 8B.

<STEP 704: Determine Edge Direction>

The CPU 11 calculates Grd absolute values in the four directions of the pixel of interest in Grd in the four directions calculated in STEP 703. The CPU 11 determines a direction that shows a maximum Grd absolute value of those in the four directions as an edge direction of the pixel of interest. That is, the differences between densities of pixels before and after the pixel of interest in some directions including the pixel of interest are obtained, and if the difference is large, that is, if the density changes largely between pixels that sandwich the pixel of interest, that direction can be determined as a direction perpendicular to the edge of an image (edge direction).

<STEP 705: Calculate Variation>

The CPU 11 can calculate five Grd values in STEP 703 from seven pixels that line up in the edge direction determined in STEP 704. The CPU 11 compares these five Grd values and calculates their maximum absolute value as a variation (edge amount) of the pixel of interest. An edge is stronger with increasing variation, and is close to flat with decreasing variation.

<STEP 706: Area Determination>

The CPU 11 executes area determination based on the variation calculated in STEP 705. Let EMAX be the maximum value of the variations, and TA be a determination threshold. Then, the CPU 11 executes area determination by:

EMAX≧TA ... edge area
EMAX<TA ... flat area

Note that the determination threshold TA is a value that separates the edge area and flat area: bold and thin characters (to be described later) belong to the edge area, and halftone and photo (to be described later) belong to the flat area.

<STEP 707: Process Branch Determination>

In STEP 707, the CPU 11 branches the process based on the area determined in STEP 706. If the area is determined to be an edge area, the process advances to STEP 708A; if the area is determined to be a flat area, the process advances to STEP 708B.

<STEP 708: Define Zero Certifying Width>

In STEP 708, the CPU 11 defines a zero certifying width W (to be described later). This zero certifying width W is prepared in advance for respective attributes of an area. If the area is determined to be an edge area as a result of area determination in STEP 707, the CPU 11 defines a zero certifying width for edge in STEP 708A; otherwise, it defines a zero certifying width for flat in STEP 708B.

<STEP 709: Ternarization Process>

The CPU 11 executes a ternarization process for the four directions in the process area extracted in STEP 702 using the zero certifying width for Grd determined in STEP 708 (FIGS. 8E and 8F) As a result, Grd calculated using equation (2) is converted into one of 1, 0, and −1.

<STEP 710: Measure Variation Time Count>

The CPU 11 measures the number of times of zero-crossing using Grd data ternarized in STEP 709.

<STEP 711: Area Determination>

The CPU 11 checks using the area determination result in STEP 706 and the variation time count measured in STEP 710 if the pixel of interest belongs to one of photo, bold line, thin line, and halftone attributes.

In this embodiment, the process for attribute determination is executed according to STEPS 701 to 711. The ternarization process in STEP 709, variation time count measurement in STEP 710, and attribute determination in STEP 711 will be independently described in detail below.

(Ternarization Process)

Figure 6:
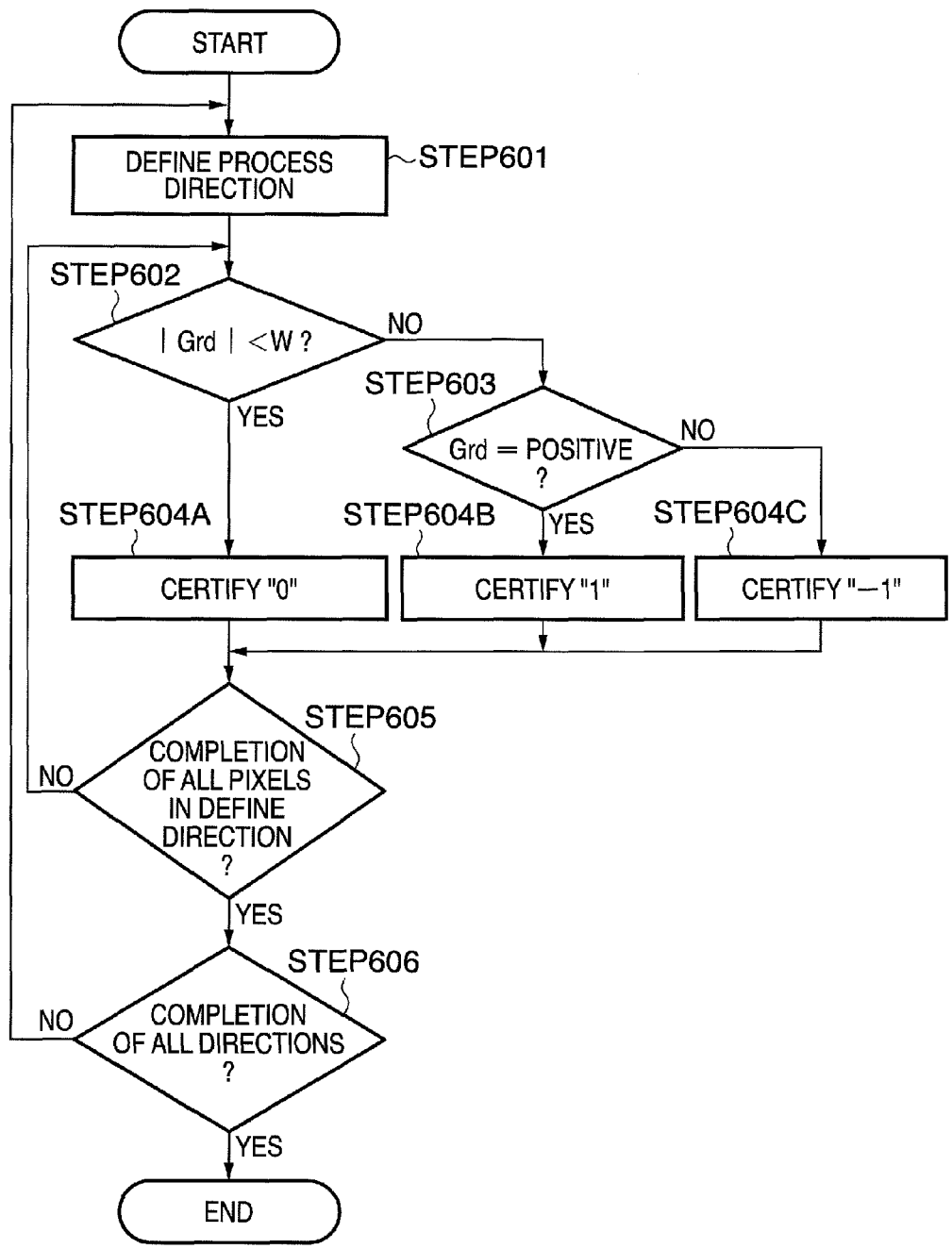
FIG. 6 is a flowchart of a ternarization process.

FIG. 6 is a flowchart of the ternarization process. A description will be given along respective steps of the flowchart.

<STEP 601: Select Process Direction>

The CPU 11 selects one of the four directions (one horizontal direction, one vertical direction, and two oblique directions) extracted in STEP 702. The selection order of directions is not particularly limited, and a predetermined order may be used. The CPU 11 acquires the differences Grd of L calculated in STEP 703 for the selected direction. The CPU 11 acquires Grd data for five pixels by applying equation (2) using the pixel values of seven pixels.

<STEP 602: Comparison Process with Zero Certifying Width W>

The CPU 11 compares the absolute values of the acquired Grd data with the zero certifying width W defined in STEP 708. If the absolute value of Grd is smaller than the zero certifying width W, the process advances to STEP 604A to certify "0". If the absolute value is equal to or larger than the zero certifying width W, the process advances to STEP 603.

|Grd|<W ... Zero Certified

<STEP 603: Grd Sign Determination>

The CPU 11 determines the sign of Grd. If the CPU 11 certifies "1" in STEP 604B, and that Grd has a negative sign, "−1" is determined in STEP 604C.

<STEP 605: Pixel Determination>

After the pixel of interest is determined to be one of ternary values "0", "1", and "−1", the CPU 11 checks in STEP 605 if ternarization is complete for all pixels in the direction of interest. If ternarization is complete for all pixels, the process advances to STEP 606; otherwise, the process returns to STEP 602 to repeat the ternarization process.

<STEP 606: Direction Determination>

After the ternarization process is complete for all the pixels in the direction of interest, the CPU 11 checks in STEP 606 if ternarization is complete for all the directions. If ternarization is complete for all the directions, the process ends; otherwise, the process returns to STEP 601 to execute the process for the next direction to be processed.

Figure 8F:
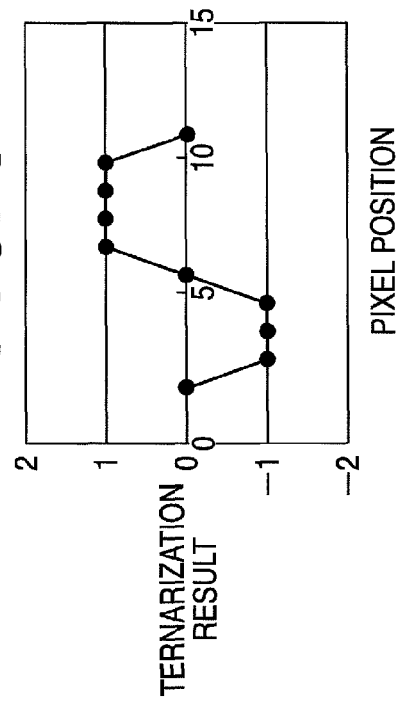

FIGS. 8A to 8H are graphs after execution of the ternarization process. FIGS. 8A and 8B show scanned luminance signal values. By calculating the differences between the luminance signal values of neighboring pixels, FIGS. 8C and 8D are obtained. Upon execution of ternarization based on FIGS. 8C and 8D, ternarized data shown in FIGS. 8E and 8F are calculated.

The ternarization to be executed in this embodiment will be described on a conceptual basis. When a change of pixel values in a plurality of directions including the pixel of interest is smaller than a predetermined zero certifying width, "0" is determined. If the change is largely decreased from the predetermined value at pixels before and after the pixel of interest, "−1" is determined; otherwise, "1" is determined.

(Variation Time Count Measurement Process)

Figure 10A:
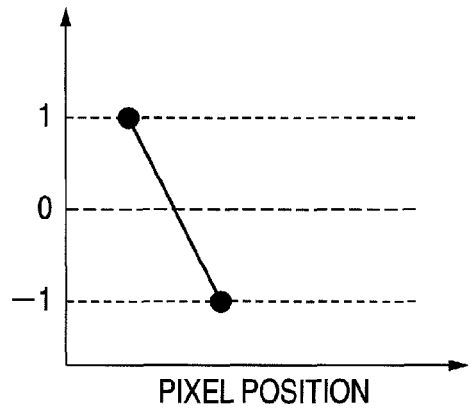
FIGS. 10A to 10F are graphs showing patterns of zero-crossing points.
Figure 10B:
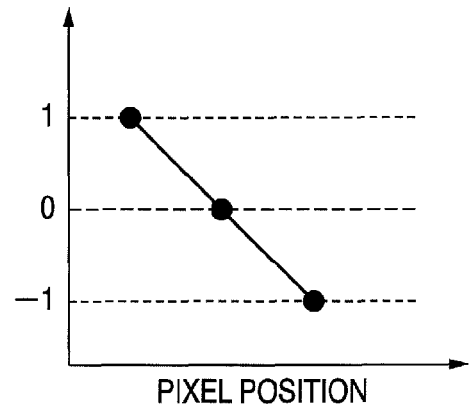
Figure 10C:
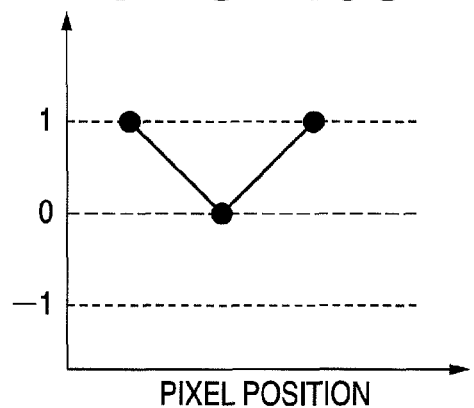
Figure 10D:
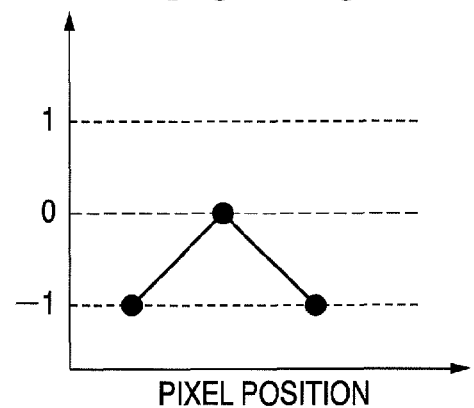
Figure 10E:
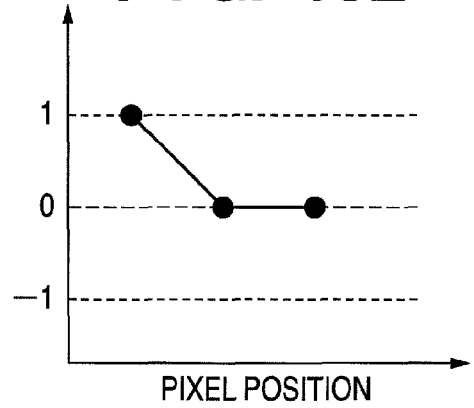
Figure 10F:
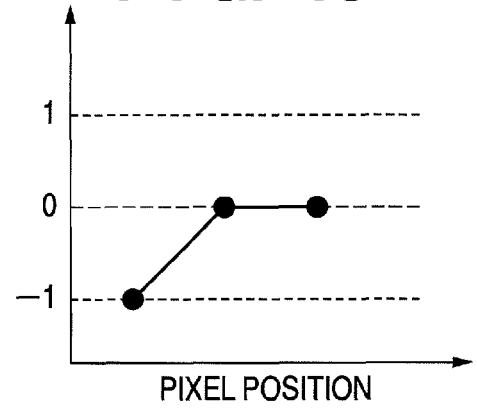

The variation time count measurement in STEP 710 in FIG. 7 will be described in detail below. This embodiment adopts the number of zero-crossing points that cross zero as the variation time count. FIGS. 10A to 10F show the definitions of zero-crossing. In FIGS. 10A and 10B, a zero-crossing point is determined. In FIGS. 10C to 10F, a zero-crossing point is not determined. That is, a zero-crossing point is determined in four types: "1"→"−1" ... (pattern A), "−1"→"1" ... (pattern A) , "1"→"0"→"−1" ... (pattern B), and "−1"→"0"→"1" ... (pattern B). However, these definitions are those in this embodiment, and the definition method is not limited to such a specific method.

When the process range is defined using 7×7 pixels like in this embodiment, five difference data Grd are obtained per direction. Hence, the maximum number of zero-crossing points per direction is four in case of "1"→"−1"→"1"→"−1"→"1" or "−1"→"1"→"−1"→"1"→"−1". Since they are measured in all the four directions, the maximum number of zero-crossing points in the area of interest is 16.

Figure 11:
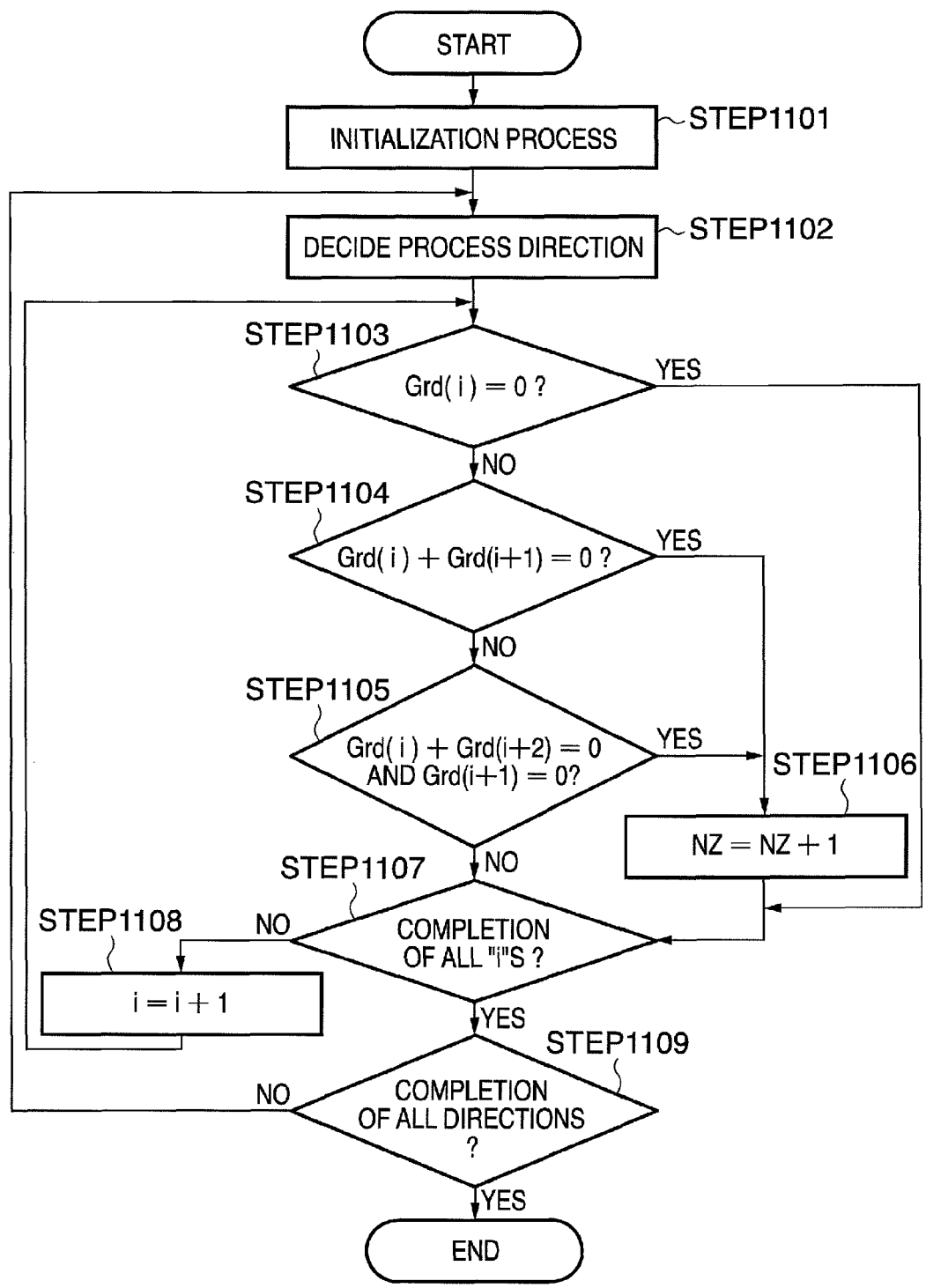
FIG. 11 is a flowchart of variation time count measurement.

FIG. 11 is a flowchart of the variation time count measurement. A description will be given along respective steps of the flowchart.

<STEP 1101: Initialization Process>

Prior to execution of the process, the CPU 11 initializes a variable. Let NZ be a variation time count to be measured. Then, the CPU 11 defines "0" in the initialization process. That is, NZ=0.

<STEP 1102: Select Process Direction>

The CPU 11 selects one of the four directions, that is, one horizontal direction, one vertical direction, and two oblique directions, extracted in STEP 702 in FIG. 7. The selection order of directions is not particularly limited, and a predetermined order may be used. The CPU 11 acquires the results of the ternarization process executed in STEP 709 in FIG. 7 for the selected direction.

<STEP 1103: Zero Determination>

Let Grd(i) be Grd at pixel position i ($0 \leq i < 5$) of Grd in the direction of interest. Then, the CPU 11 checks in STEP 1103 if Grd(i) is zero. If Grd(i) is zero, since a zero-crossing point never occurs, the process jumps to STEP 1107. If Grd(i) is other than zero, the process advances to STEP 1104 to execute the next determination.

<STEP 1104: Zero-crossing Point Determination 1>

The CPU 11 checks in STEP 1104 if a zero-crossing point of pattern A above has occurred. Let (i+1) be a position of a neighboring pixel of Grd(i), and Grd(i+1) be that Grd. Then, if the condition Grd(i) +Grd(i+1)=0 is met, the CPU 11 determines occurrence of zero-crossing, and the process advances to STEP 1106. If this condition is not met, the process advances to STEP 1105 to execute zero-crossing point determination 2.

<STEP 1105: Zero-crossing Point Determination 2>

The CPU 11 checks in STEP 1105 if a zero-crossing point of pattern B above has occurred. Let (i+2) be a pixel position separated by two pixels from Grd(i), and Grd(i+2) be that Grd. Then, if the conditions Grd(i)+Grd(i+2)=0 and Grd(i+1)=0 are met, the CPU 11 determines occurrence of zero-crossing, and the process advances to STEP 1106. If these conditions are not met, the CPU 11 determines that a zero-crossing point corresponding to pattern A or B does not occur, and the process jumps to STEP 1107.

<STEP 1106: Increment Variation Time Count>

If the CPU 11 determines occurrence of zero-crossing in zero-crossing point determination in STEPS 1104 and 1105, it increments a variation time count value by 1 in STEP 1106. That is, NZ=NZ+1.

<STEP 1107: Pixel Determination>

The CPU 11 checks if zero-crossing determination is complete for all Grd data in the direction of interest. If zero-crossing determination is complete for all pixels, the process advances to STEP 1109; otherwise, the process advances to STEP 1108 to continue the zero-crossing point determination process.

<STEP 1108: Shift Grd Pixel Value>

If it is determined in STEP 1107 that zero-crossing determination is not complete yet for all the Grd data in the direction of interest, the CPU 11 increments position i by 1 in this step to execute the zero-crossing point determination.

<STEP 1109: Direction Determination>

After the zero-crossing point determination is complete for all the Grd data in the direction of interest, the CPU 11 checks in STEP 1109 if the zero-crossing point determination is complete for all the directions. If the zero-crossing point determination is complete for all the directions, the variation time count measurement is complete; otherwise, the process returns to STEP 1102 to execute a process for the next direction to be processed.

(Attribute Determination Process)

The attribute determination in STEP 711 in FIG. 7 will be described in detail below. The CPU 11 determines using the area determination result in STEP 706 and the variation time count obtained in STEP 710 if the pixel of interest belongs to a photo, bold character, thin character, or halftone attribute.

Figure 12:
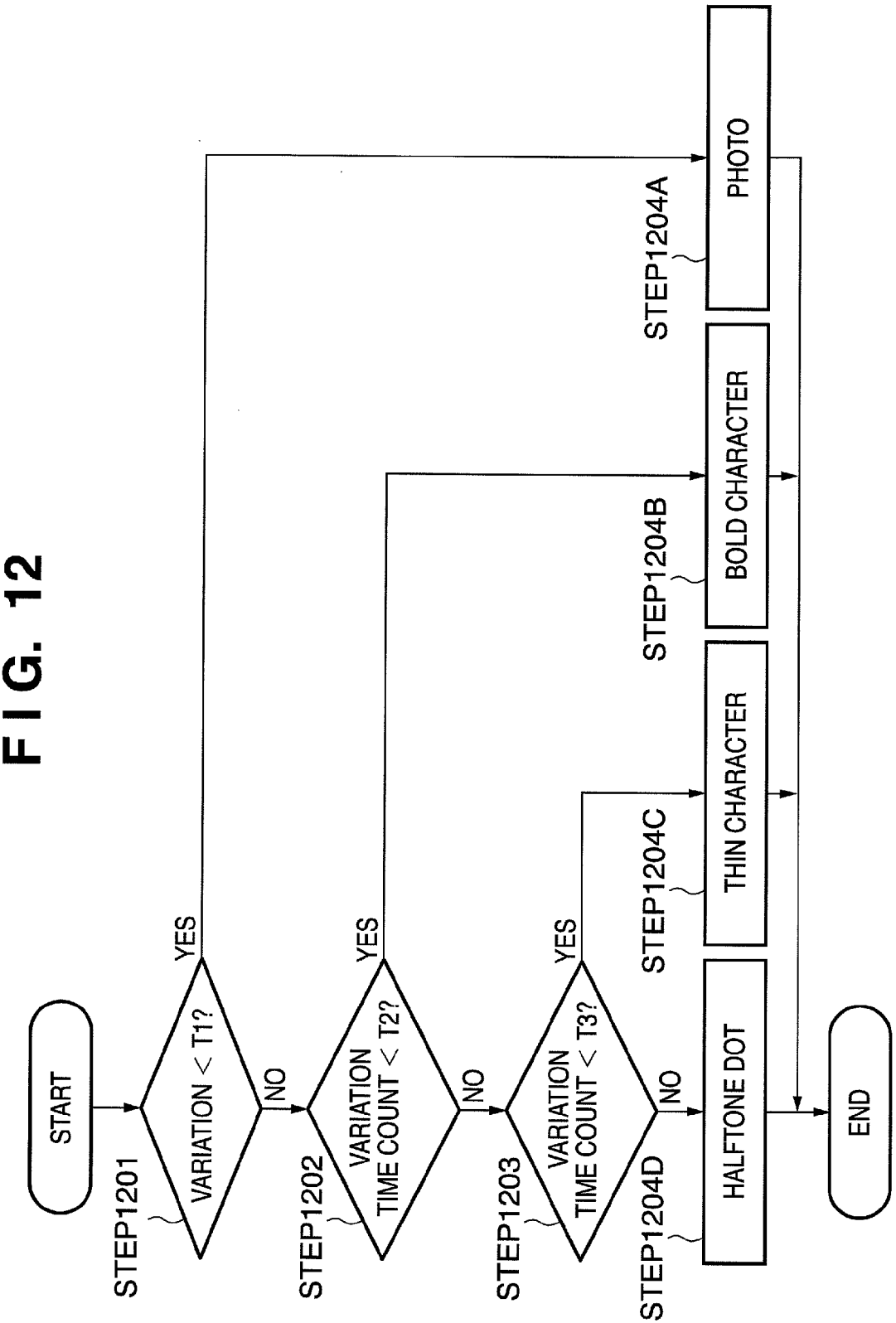
FIG. 12 is a flowchart of an attribute determination unit.

FIG. 12 is a flowchart of the attribute determination process. A description will be given along respective steps of the flowchart.

<STEP 1201: Variation Determination>

The CPU 11 compares the variation calculated in STEP 705 in FIG. 7 with a threshold T1 defined in advance. If the variation is smaller than the threshold T1, the process advances to STEP 1204A to determine that the pixel belongs to a photo attribute. If the variation is larger than the threshold T1, the process advances to STEP 1202 to execute the next determination process. That is, when no large variations of pixel values are observed anywhere in a pixel group included in the area that surrounds the pixel of interest, a photo attribute is determined. Note that the relationship between the threshold T1 and determination threshold TA in STEP 706 in FIG. 7 is as follows. The threshold TA is a value which is defined so that halftone and photo belong to the flat area. On the other hand, the threshold T1 is a value which is defined so that only photo belongs to the flat area. The threshold T1 separates the halftone and photo areas.

<STEP 1202: Variation Time Count Determination 1>

The CPU 11 compares the variation time count measured in STEP 710 in FIG. 7 with a threshold T2 which is defined in advance. If the variation time count is smaller than the threshold T2, the process advances to STEP 1204B to determine that the pixel of interest belongs to a bold character attribute. If the variation time count is larger than the threshold T2, the process advances to STEP 1203 to execute the next determination process. That is, when relatively large variations of pixel values are observed in a pixel group included in the area that surrounds the pixel of interest but the variation time count is smaller than the threshold, since density changes like white, white, black, black, black, black, and white may occur in that area, a bold character attribute is determined.

<STEP 1203: Variation Time Count Determination 2>

As in STEP 1202, the CPU 11 compares the variation time count measured in STEP 710 in FIG. 7 with a threshold T3 (T3>T2) which is defined in advance. If the variation time count is smaller than the threshold T3, the process advances to STEP 1204C to determine that the pixel of interest belongs to a thin character attribute. If the variation time count is larger than the threshold T3, the process advances to STEP 1204D to determine that the pixel of interest belongs to a halftone attribute. That is, when relatively large variations of pixel values are observed in a pixel group included in the area that surrounds the pixel of interest but the variation time count falls within a predetermined range, since density changes like white, black, black, white, black, black, and white may occur, a thin character attribute is determined. On the other hand, when relatively large variations of pixel values are observed in a pixel group included in the area that surrounds the pixel of interest but the variation time count exceeds the threshold, since density changes like white, black, white, black, white, black, white, and black may occur, a halftone attribute is determined.

<STEP 1204: Attribute Certifying Process>

In STEP 1204, the CPU 11 certifies an attribute of the pixel based on the result determined in STEPS 1201 to 1203. The CPU 11 certifies a photo attribute in STEP 1204A, a bold character attribute in STEP 1204B, a thin character attribute in STEP 1204C, and a halftone attribute in STEP 1204D.

Figure 23:
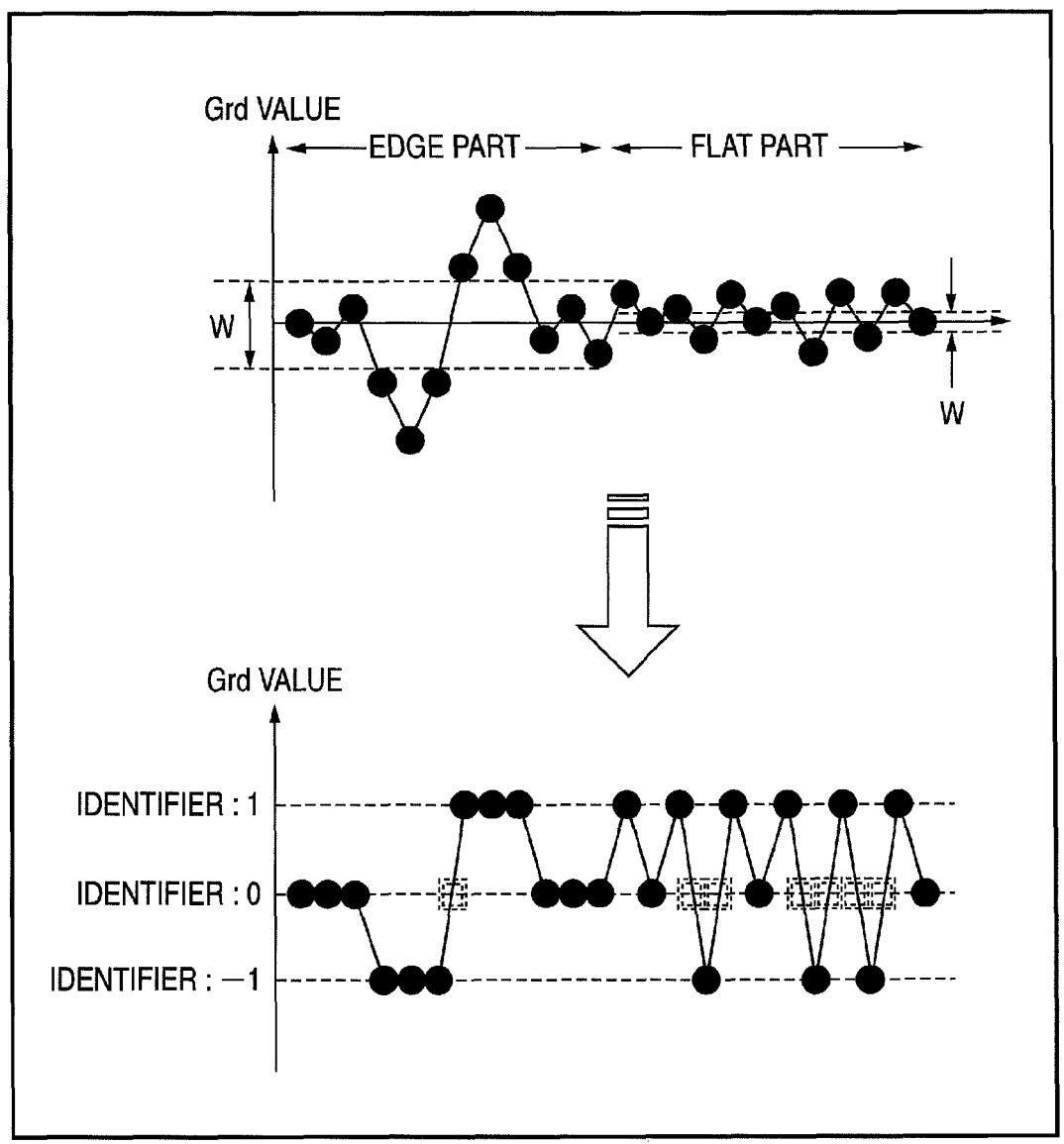
FIG. 23 is a view showing a variation time count when different values (nonzero values) of zero certifying widths W are defined for edge and flat areas.

As described above, according to this embodiment, the ternarization process is executed using the threshold defined in advance upon measuring the variation time count, and the variation time count is measured based on the ternarization process result, thus determining an attribute. The threshold (zero certifying width W) used in the ternarization process is switched between the flat and edge areas. FIGS. 22 and 23 show the states of Grd obtained from an image including noise, errors, and the like produced upon scanning or the like. FIG. 22 shows a case in which the threshold used in the ternarization process is zero (when no zero certifying width W is used or the zero certifying width W is defined to be zero). FIG. 23 shows a case wherein the threshold used in the ternarization process has a width (the zero certifying width W is defined to be a nonzero value). As can be seen from comparison between FIGS. 22 and 23, the variation time count (the number of zero-crossing points) larger by the number of times bounded by solid line rectangles than in FIG. 23 is measured in FIG. 22. As a result, the attribute of the edge area may be erroneously determined as the flat area. By contrast, in this embodiment, since the threshold (zero certifying width W) used in the ternarization process is defined, as shown in FIG. 23, the variation time count can be prevented from increasing due to noise, errors, and the like generated upon scanning or the like.

In this way, the attribute determination process and image adjusting process using the variation time count can appropriately remove noise, errors, and the like generated upon scanning or the like from the variation time count. The attribute determination results can be attained with high accuracy and optimal adjusting process since the attribute determination process and image adjusting process are executed based on these values.

Second Embodiment

The second embodiment will explain image adjusting using the attribute certifying method described in the first embodiment. This embodiment uses the measurement result of the number of zero-crossing points and the variation described in the first embodiment, and executes adjusting based on edge emphasis. This makes it possible to improve legibility of a character with an edge portion rounded by the scanning MTF. Since other arrangements and operations are the same as those in the first embodiment, a repetitive description thereof will be avoided.

Figure 13:
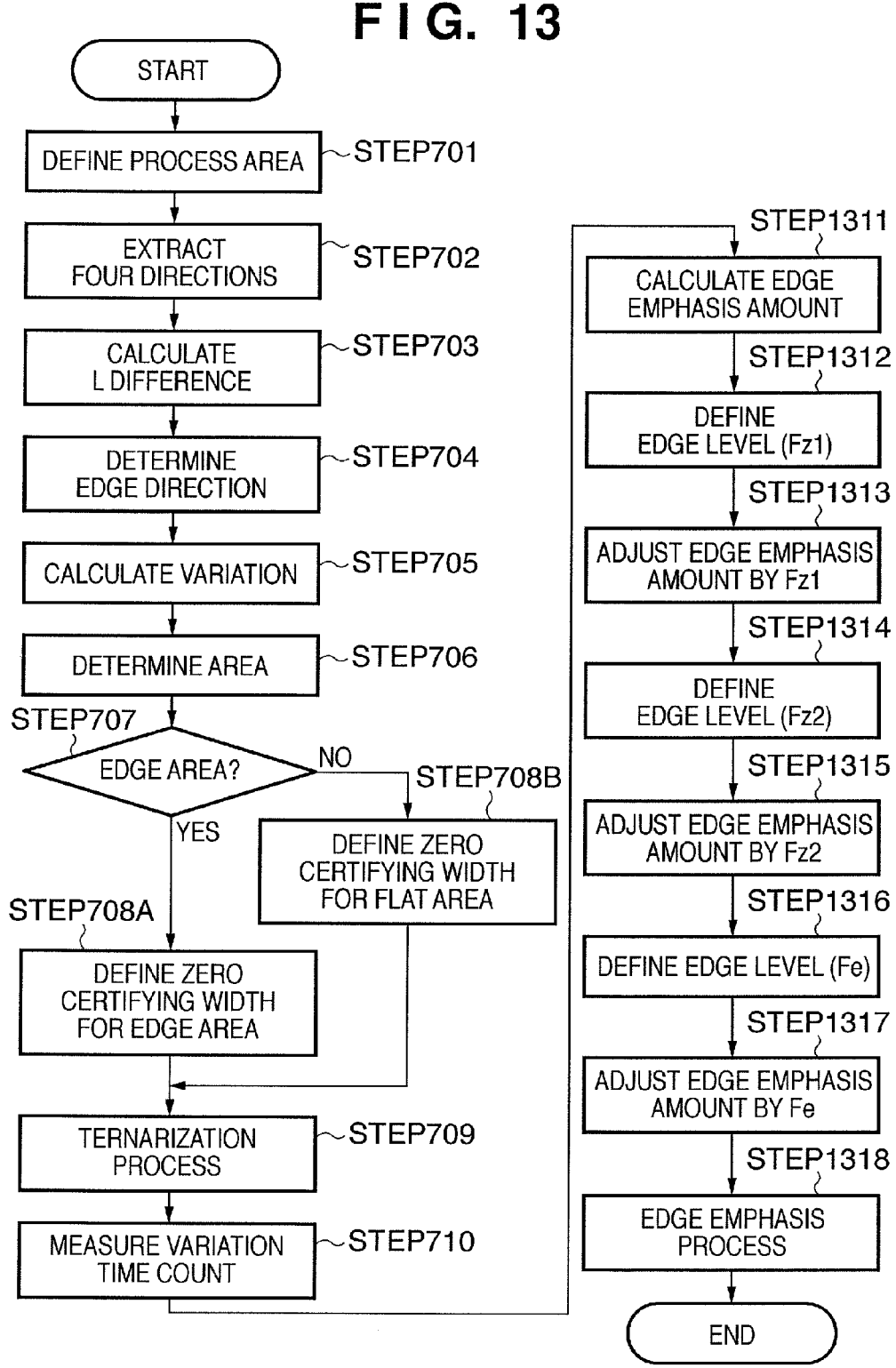
FIG. 13 is a flowchart of image adjusting of the second embodiment.

FIG. 13 is a flowchart of the image adjusting process according to the second embodiment. A description will be given along respective steps of the flowchart. Note that some processes are the same as those described with reference to FIG. 7. Hence, the same step numbers denote the same processes, and a description thereof will not be repeated.

<STEP 1311: Calculate Edge Emphasis Amount>

The CPU 11 calculates differences (edge emphasis amounts) between the pixel value of interest upon applying an edge emphasis filter and that before application for respective colors in the 7×7 RGB areas defined in STEP 701. This embodiment will exemplify a case in which a 5×5 edge emphasis filter is applied to have the pixel of interest as the center. However, the present invention is not limited to such a specific example. The filter size need only be smaller than the process area size defined in STEP 701, and filter coefficients may be appropriately defined. FIG. 14A shows an example of filter coefficients of a 5×5 edge emphasis filter. Let N0 be an original pixel value of interest, N1 be a pixel value of interest as a result of application of the filter in FIG. 14A, and $\Delta F$ be an edge emphasis amount. $\Delta F$ can be calculated by:

$$\Delta F = N1 - N0 \qquad (6)$$

As shown in FIG. 14B, when the filter coefficient of the pixel of interest is defined to be a value obtained by subtracting the filter total value in FIG. 14A from the filter coefficient at the position of the pixel of interest in FIG. 14A, $\Delta F$ can be calculated by only applying FIG. 14B.

<STEP 1312: Define Edge Level (Fz1)>

Figure 15A:
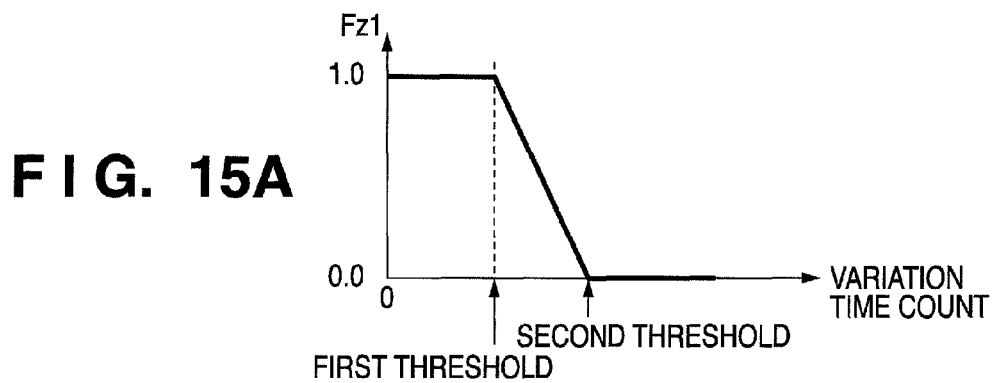
FIGS. 15A to 15D are graphs for explaining an edge level defining process.

The CPU 11 adaptively defines an edge level or magnitude Fz1 n accordance with the variation time count calculated in STEP 710. FIG. 15A is a graph for explaining the Fz1 defining process in STEP 1312: the abscissa plots the variation time count, and the ordinate plots Fz1. In case of the variation time count smaller than a first threshold, since a text area is more likely to be determined, Fz1 is defined to be 1 to emphasize the edge. In case of the variation time count larger than a second threshold, since a halftone area that readily causes moiré at high LPI is more likely to be determined, Fz1 is defined to be 0 so as not to emphasize moiré. In case of the variation time count falling within a range between the first and second thresholds (both inclusive), different Fz1 is adaptively defined for each variation time count to have Fz1=1 when the variation time count=the first threshold and Fz1=0 when the variation time count=the second threshold, so as to obscure switching of the processes. More specifically, the CPU 11 can adaptively define Fz1 using FIG. 15A or using:

$$Fz1 = (\text{second threshold} - \text{variation time count})/(\text{second threshold} - \text{first threshold}) \qquad (3)$$

<STEP 1313: Adjust Edge Emphasis Amount by Fz1>

The CPU 11 adjusts the edge emphasis amounts $\Delta F$ calculated in STEP 1311 using the edge level Fz1 defined in STEP 1312. The CPU 11 calculates an adjusted edge emphasis amount $\Delta Fz1$ using:

$$\Delta Fz1 = Fz1 \times \Delta F \qquad (7)$$

In this way, a text area with a small variation time count can undergo relatively strong edge emphasis, and a halftone area with a large variation time count can undergo relatively weak edge emphasis. Hence, the sharpness of text can be enhanced, and moiré can be prevented from being emphasized at the same time.

<STEP 1314: Define Edge Level (Fz2)>

Figure 15B:
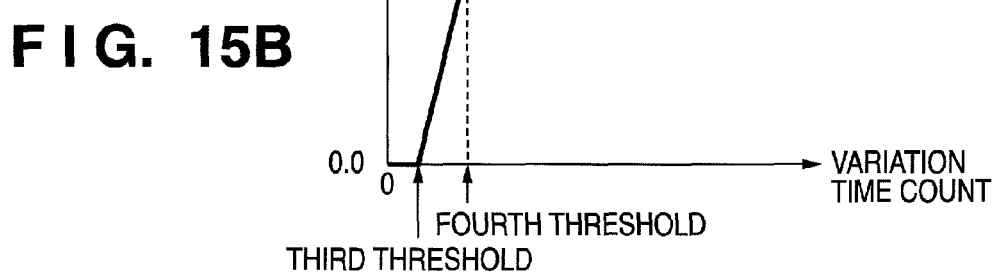

The CPU 11 adaptively defines an edge level Fz2 in accordance with the variation time count calculated in STEP 710. FIG. 15B is a graph for explaining the Fz2 defining process in STEP 1314: the abscissa plots the variation time count, and the ordinate plots Fz2. FIG. 15B aims at attaining FIG. 15C when it is combined with FIG. 15A. In case of the variation time count=0, a bold line area is more likely to be determined. When such bold line area undergoes edge emphasis using an edge emphasis filter (to be described later), bordering in which a border part of the bold line area darkens occurs. In order to prevent bordering, in case of the variation time count which is smaller than a third threshold and with which the bold line area is more likely to be determined, Fz2 is defined to be 0 to suppress edge emphasis. In case of the variation time count which is larger than a fourth threshold and with which a thin line area is more likely to be determined, Fz2 is defined to be 1 to apply edge emphasis. In case of the variation time count falling within a range between the third and fourth thresholds (both inclusive), different Fz2 is adaptively defined for each variation time count to have Fz2=0 when the variation time count=the third threshold and Fz2=1 when the variation time count=the fourth threshold, so as to obscure switching of the processes. More specifically, the CPU 11 can adaptively define Fz2 using FIG. 15B or using:

$$Fz2 = (\text{variation time count} - \text{third threshold})/(\text{fourth threshold} - \text{third threshold}) \qquad (4)$$

Figure 15C:
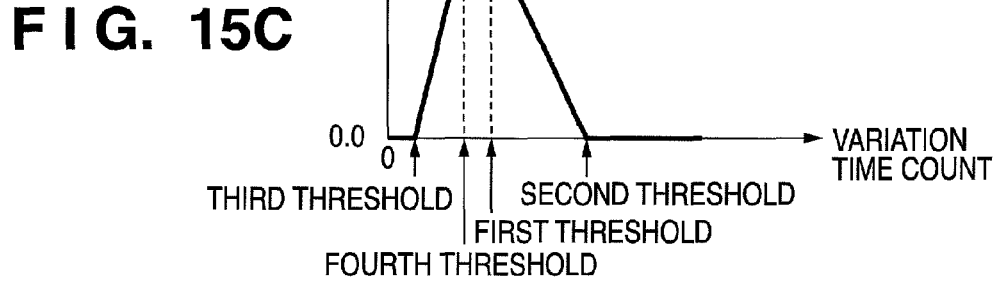

Fz1×Fz2 can implement the edge level shown in FIG. 15C. If bordering is required, Fz2=1 can be defined irrespective of the variation time count.

<STEP 1315: Adjust Edge Emphasis Amount by Fz2>

The CPU 11 adjusts the edge emphasis amount $\Delta Fz1$ calculated in STEP 1313 using the edge level Fz2 defined in STEP 1314. The CPU 11 calculates an adjusted edge emphasis amount $\Delta Fz2$ using:

$$\Delta Fz2 = Fz2 \times \Delta Fz1 \qquad (8)$$

When Fz2 is defined, as shown in FIG. 15B, the bold line area undergoes edge emphasis to prevent bordering, and the thin line area undergoes edge emphasis stronger than the bold line area to enhance the sharpness and increase the density of a black character.

<STEP 1316: Define Edge Level (Fe)>

Figure 15D:
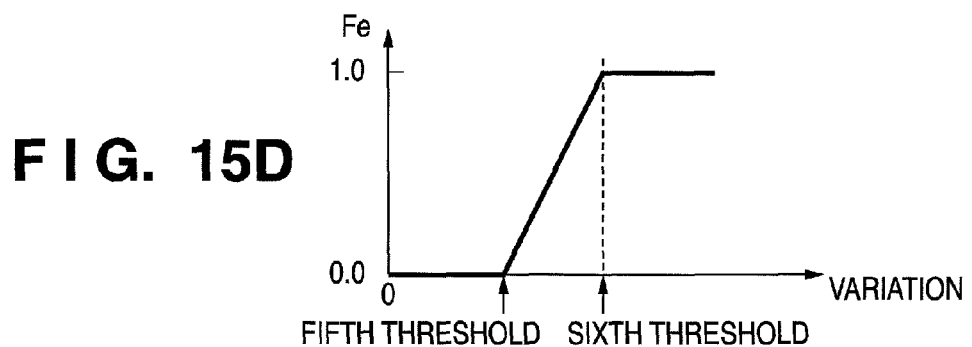

The CPU 11 adaptively defines an edge level Fe in accordance with the variation calculated in STEP 705. FIG. 15D is a graph for explaining the Fe defining process in STEP 1316: the abscissa plots the variation, and the ordinate plots Fe. In case of the variation which is smaller than a fifth threshold and with which a flat area is more likely to be determined, Fe=0 is defined so as not to roughen an image by emphasizing small variations. In case of the variation which is smaller than a sixth threshold and with which an edge area is more likely to be determined, Fe=1 is defined to apply edge emphasis. In case of the variation falling within a range between the fifth and sixth thresholds (both inclusive), different Fe is adaptively defined for each variation to have Fe=0 when the variation=the fifth threshold and Fe=1 when the variation=the sixth threshold, so as to obscure switching of the processes. More specifically, the CPU 11 can adaptively define Fe using FIG. 15D or using:

$$Fe = (\text{variation} - \text{fifth threshold})/(\text{sixth threshold} - \text{fifth threshold}) \quad (5)$$

<STEP 1317: Adjust Edge Emphasis Amount by Fe>

The CPU 11 adjusts the edge emphasis amount ΔFz2 calculated in STEP 1315 using the edge level Fe defined in STEP 1316. The CPU 11 calculates an adjusted edge emphasis amount ΔFe using:

$$\Delta Fe = Fe \times \Delta Fz2 \quad (9)$$

In this way, the edge area such as a character can undergo relatively strong edge emphasis, and the flat area such as a background or photo can undergo relatively weak edge emphasis. As a result, the sharpness of a character can be enhanced, moiré can be prevented from being emphasized, and a photo can be prevented from being roughened at the same time.

<STEP 1318: Edge Emphasis Process>

The CPU 11 calculates an edge emphasis filter-processed pixel value Ne by adding the edge emphasis amount ΔFe calculated in STEP 1317 to the pixel value N0 of interest, as given by:

$$Ne = N0 + \Delta Fe \quad (10)$$

Note that a process for clipping Ne within a desired range may be inserted.

Note that this embodiment separates the edge level defining process based on the variation time count into two stages, that is, Fz1 and Fz2 to give a more detailed explanation. However, the present invention is not limited to this. For example, the level defining process of Fz1×Fz2 shown in FIG. 15C may be made in advance in one stage, or one of Fz1 and Fz2 may be used for any purpose.

Third Embodiment

In the aforementioned first and second embodiments, the thresholds used upon measuring the variation time count are varied for respective flat and edge areas to execute the attribute determination and image adjusting processes. In particular, the second embodiment has exemplified the edge emphasis process as the image adjusting process, and controls the thresholds to attain the processes using continuous edge levels based on the variation time count.

In case of the image adjusting process using the thresholds, switching of the processes near the threshold may often cause bad effects on an image. Hence, the processes using continuous edge levels is very effective upon executing the image adjusting process. By contrast, this embodiment adopts this concept even in the variation time count measurement process, and implements more satisfactory image adjusting that can obscure switching. Since other arrangements and operations are the same as those in the first embodiment, a repetitive description thereof will be avoided.

Figure 16:
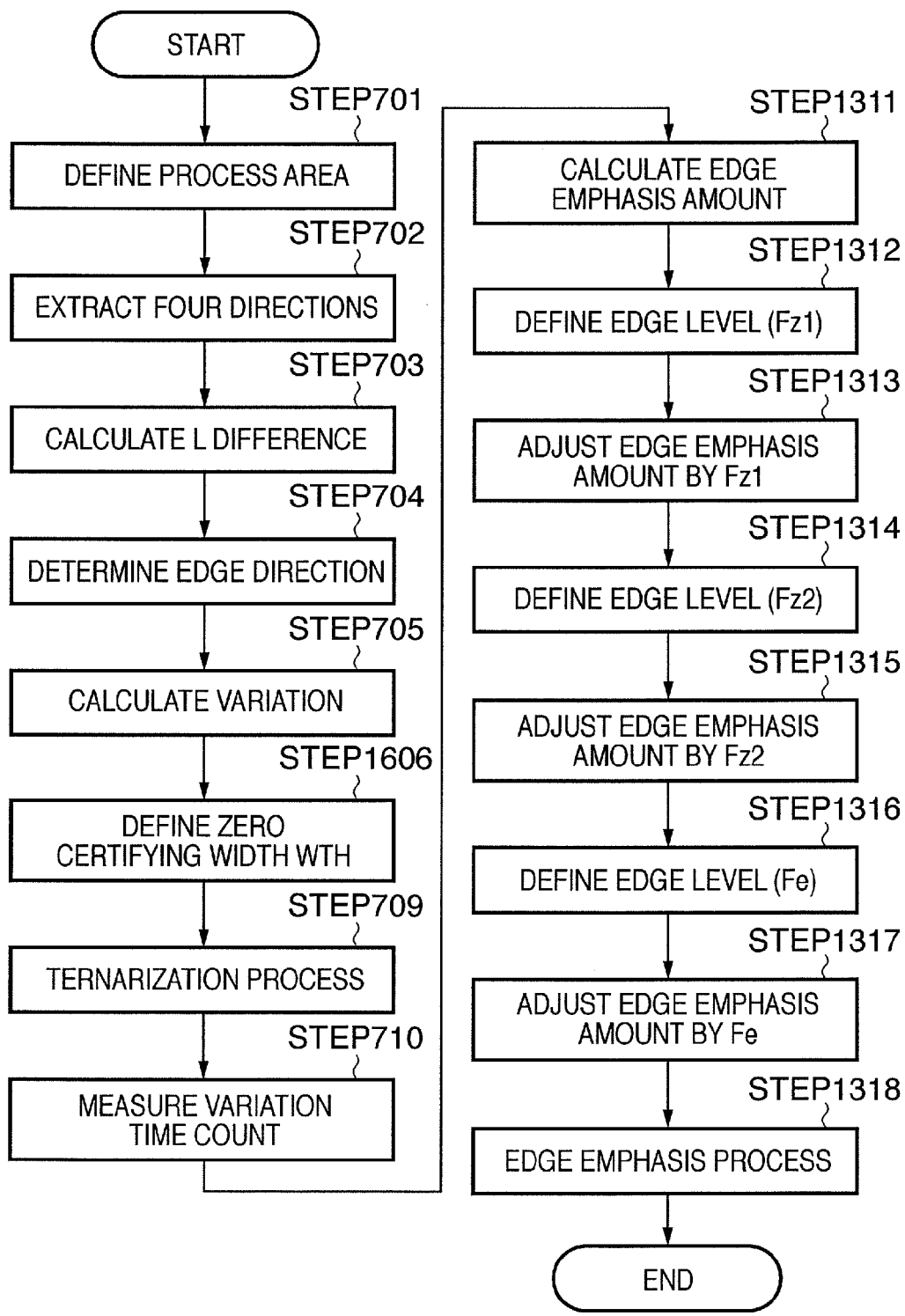
FIG. 16 is a flowchart of an adaptive zero certifying process of the third embodiment.

FIG. 16 is a flowchart of the image adjusting process according to the third embodiment. A description will be given along respective steps of the flowchart. Note that some processes are the same as those described with reference to FIG. 7, and a description thereof will not be repeated.

<STEP 1606: Define Zero Certifying Width WTH>

Figure 17:
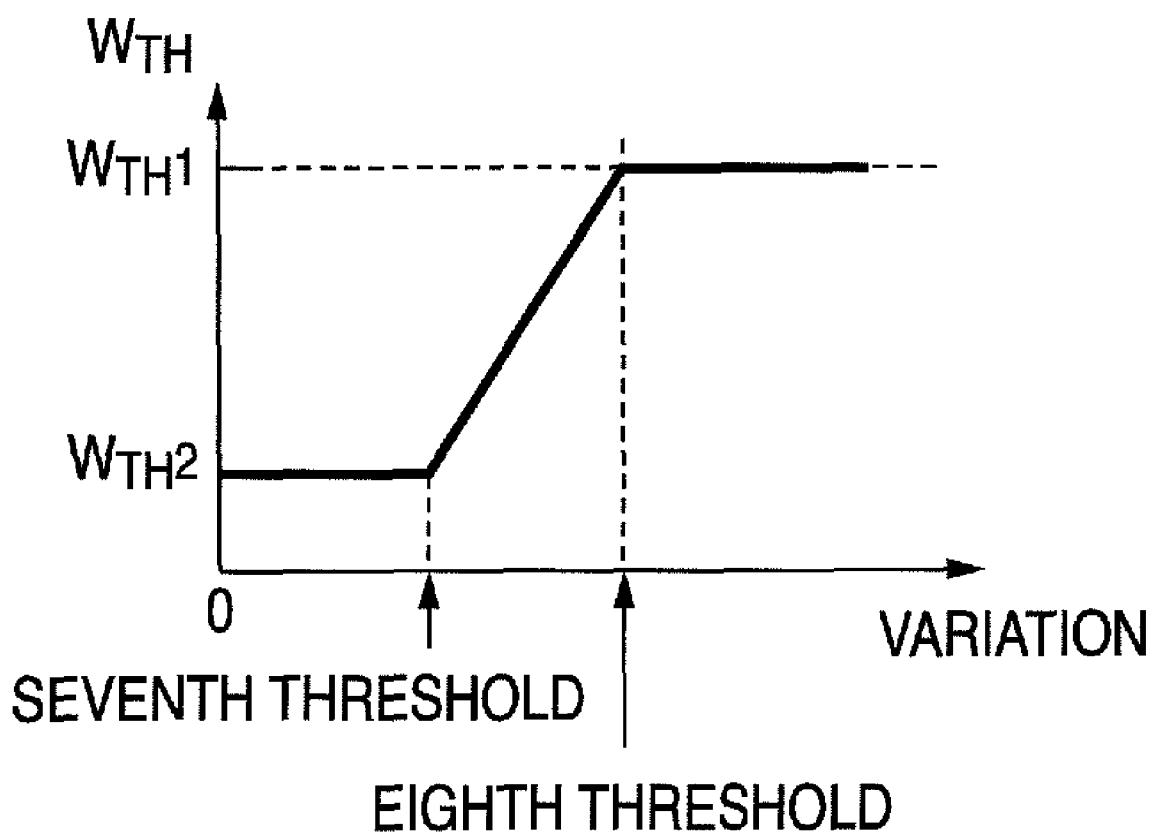
FIG. 17 is a graph for explaining a zero certifying width.

The CPU 11 adaptively defines a zero certifying width WTH in accordance with the variation calculated in STEP 705. FIG. 17 is a graph for explaining the WTH defining process in STEP 1606: the abscissa plots the variation, and the ordinate plots WTH. In case of the variation which is smaller than a seventh threshold and with which a flat area is more likely to be determined, a relatively small value WTH=WTH2 is defined to remove noise in the flat area. In case of the variable amount which is larger than an eighth threshold and with which an edge area is more likely to be determined, a relatively large value WTH=WTH1 is defined to avoid that the edge emphasis processing is not executed when excessive zero certification is made due to noise and halftone is consequently determined. In case of the variation falling within the range between the seventh and eighth thresholds (both inclusive), different WTH is adaptively defined for each variation to have WTH=WTH2 when the variation=the seventh threshold and WTH=WTH1 when the variation=the eighth threshold, so as to obscure switching of the processes. More specifically, the CPU 11 can adaptively define WTH with reference to FIG. 17 or using:

$$WTH = (\text{variation} - \text{seventh threshold})/(\text{eighth threshold} - \text{seventh threshold}) \quad (11)$$

<STEP 709: Ternarization Process>

The CPU 11 executes the ternarization process in the four directions in the process area extracted in STEP 702 using the zero certifying width WTH determined in STEP 1606. The zero certifying process executed in this ternarization process uses WTH, and when the absolute value of the difference Grd of L is smaller than WTH, zero is certified.

|Grd|<WTH . . . Zero Certified

Note that the subsequent processes are the same as those in STEP 710 and STEPS 1311 to S1318 in FIG. 13. Hence, the same step numbers denote the same processes, and a repetitive description thereof will be avoided.

As described above, according to this embodiment, the ternarization process is executed using the threshold defined in advance upon measuring the variation time count, the variation time count is measured based on the ternarization process result, and the image adjusting process is executed using the variation time count, thus obtaining a more suited adjusting result. Furthermore, since the thresholds used in the ternarization process are continuously changed between the flat and edge areas, variations of signal values can be accurately removed, and bad effects on an image generated upon switching the processes can be prevented at the same time. Also, bad effects on an image due to switching of the processes near the threshold can also be prevented.

[Fourth Embodiment]

The second and third embodiments have exemplified the edge emphasis process using the filter as the image adjusting process. By contrast, this embodiment calculates a process amount to be applied in an adjusting process based on the number of zero-crossing points. That is, the variation time count represents a frequency, and it is particularly effective to use this for the process of a text area. Hence, this embodiment executes a substitution process as the adjusting process effective as that for a text area. Since other arrangements and operations are the same as those in the first embodiment, a repetitive description thereof will be avoided.

(Substitution Process)

Figure 18:
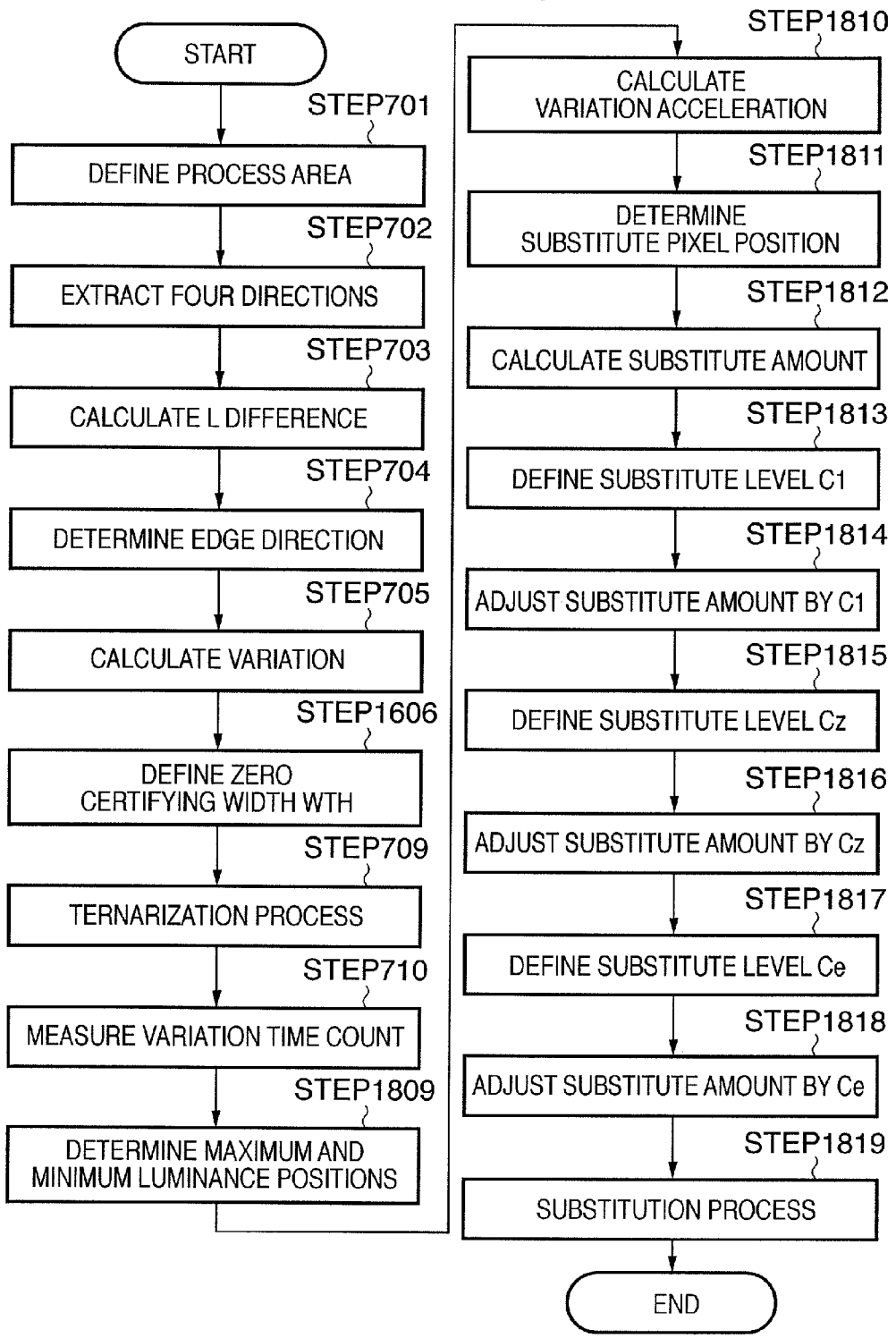
FIG. 18 is a flowchart of a substitution adjusting process in another embodiment.

FIG. 18 is a flowchart when the substitution process is used as the adjusting process. Note that some processes are the same as in FIG. 16 of the third embodiment. Hence, the same step numbers denote the same processes, and a description thereof will not be repeated.

<STEP 1809: Determine Maximum and Minimum Luminance Positions>

The CPU 11 determines pixel positions with maximum L and minimum L from seven pixels of L in the edge direction determined in STEP 704 of the four directions extracted in STEP 702.

<STEP 1810: Calculate Variation Acceleration>

Figure 8G:
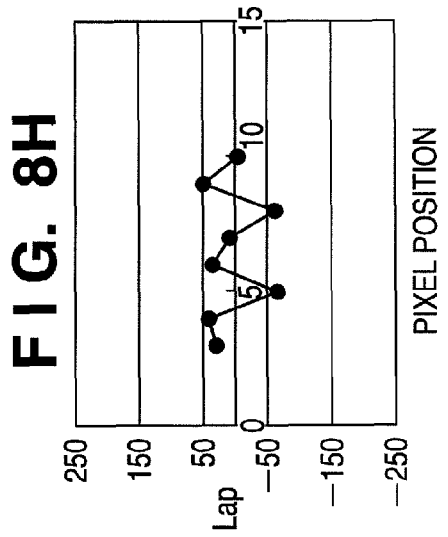
Figure 8H:
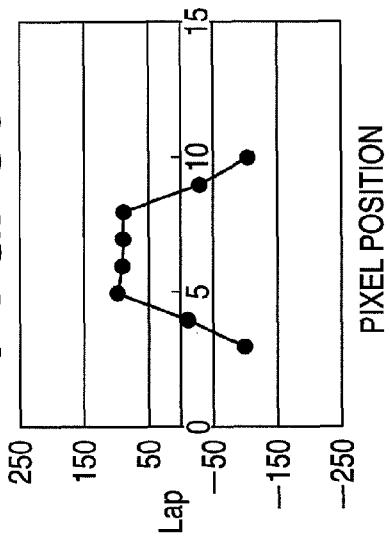

The CPU 11 calculates a variation acceleration Lap of three pixels from Grd of the edge direction calculated in STEP 703 in the edge direction determined in STEP 704. Let Grd(i−1) be a pixel before pixel Grd(i), and Grd(i+1) be a pixel after that pixel. FIGS. 8G and 8H respectively show Lap calculated by applying equation (15) to Grd shown in FIGS. 8C and 8D.

$$Lap(i)=Grd(i+1)-Grd(i-1) \quad (15)$$

Note that the calculation method of the variation acceleration is not limited to this. For example, a difference between neighboring Grd data may be calculated.

<STEP 1811: Determine Substitute Pixel Position>

The CPU 11 determines a substitute pixel position based on the pixel positions with maximum L and minimum L determined in STEP 1809 and the variation accelerations Lap calculated in STEP 1810. As shown in FIGS. 8A to 8H, when the sign of Lap is +, L of the pixel of interest tends to assume a value, the absolute value of which is closer to minimum L than maximum L; when the sign of Lap is −, L of the pixel of interest tends to assume a value, the absolute value of which is closer to maximum L than minimum L. Hence, as shown in Table 1 below, the CPU 11 determines a substitute pixel position with respect to the sign of Lap to substitute the pixel position.

Note that the CPU 11 determines the substitute pixel position, as shown in Table 1. However, handling of the edge center at which Lap of the pixel of interest becomes zero is not limited to Table 1. If Lap of the pixel of interest is zero, that pixel position may be substituted by that of maximum L or by that of minimum L.

TABLE 1

Relationship between secondary derivative sign and substitute pixel position

| Lap Sign of Pixel of Interest | Total Lap Sign of Previous and Next Pixels | Substitute Pixel Position |
|---|---|---|
| + | | Minimum L |
| − | | Maximum L |
| 0 | + | Minimum L |
| 0 | − | Maximum L |
| 0 | 0 | Maximum L |

<STEP 1812: Calculate Substitute Amount>

The CPU 11 calculates a substitute amount using the pixel value at the substitute pixel position determined in STEP 1811. The CPU 11 extracts RGB values at the substitute pixel position determined in STEP 1811 from the 7×7 RGB areas defined in STEP 701. Let N0 be the pixel value of interest, C0 be the pixel value at the substitute pixel position, and ΔC be the substitute amount. Then, ΔC can calculated using:

$$\Delta C=C0-N0 \quad (19)$$

<STEP 1813: Define Substitute Level C1>

The CPU 11 adaptively defines a substitute level C1 in accordance with the absolute value of the variable acceleration calculated in STEP 1810. FIG. 19A is a graph for explaining the C1 defining process in STEP 1813: the abscissa plots the absolute value of the variation acceleration, and the ordinate plots C1. In case of the variation acceleration which is near the edge center and is smaller than a ninth threshold, C1 is defined to be zero so as not to substitute the pixel position. The reason why the pixel position near the edge center is not substituted is to obscure generation of jaggy. In case of the absolute value of the variation acceleration which is separated away from the edge center and is larger than a 10th threshold, C1 is defined to be 1 to substitute the pixel position. In case of the absolute value of the variation acceleration falling within the range between the ninth and 10th thresholds (both inclusive), different C1 is adaptively defined for each absolute value of the variation acceleration to have C1=0 when the absolute value of the variation acceleration=the ninth threshold and C1=1 when the absolute value of the variation acceleration=the 10th threshold, so as to obscure switching of the processes. More specifically, the CPU 11 can adaptively define C1 with reference to FIG. 19A or using:

$$C1=(\text{absolute value of variation acceleration}-\text{ninth threshold})/(\text{10th threshold}-\text{ninth threshold}) \quad (16)$$

<Adjusting Process STEP 1814: Adjust Substitute Amount by C1>

The CPU 11 adjusts the substitute amount ΔC calculated in STEP 1812 by the substitute level C1 defined in STEP 1813. The CPU 11 calculates the adjusted substitute amount ΔC1 using:

$$\Delta C1=C1 \times \Delta C \quad (20)$$

By the process in STEP 1814, the substitution that suppresses generation of jaggyness can be applied.

<STEP 1815: Define Substitute Level Cz>

The CPU 11 adaptively defines a substitute level Cz in accordance with the variation time count calculated in STEP 710. The CPU 11 adaptively defines Cz based on characteristics shown in FIG. 19B using 11th and 12th thresholds. In case of a bold line area, the variation time count of which is smaller than the 11th threshold, Cz=1. In case of a thin line or halftone area, the variation time count of which is larger than the 12th threshold, Cz=0. In case of the variation time count falling within the range between the 11th and 12th thresholds (both inclusive), Cz can be adaptively defined using:

$$Cz=(\text{12th threshold}-\text{variation time count})/(\text{12th threshold}-\text{11th threshold}) \quad (17)$$

<Adjusting Process STEP 1816: Adjust Substitute Amount by Cz>

The CPU 11 adjusts the substitute amount ΔC1 calculated in STEP 1814 by the substitute level Cz defined in STEP 1815. The CPU 11 calculates the adjusted substitute amount ΔCz using:

$$\Delta Cz=Cz \times \Delta C1 \quad (21)$$

By the process in STEP 1816, the substitution that can suppress generation of jaggy can be applied by strengthening the substitute level for the bold line area, and by weakening that for the thin line area.

<STEP 1817: Define Substitute Level Ce>

The CPU 11 adaptively defines a substitute level Ce in accordance with the variation calculated in STEP 705. The CPU 11 adaptively defines Ce based on characteristics shown in FIG. 19C using 13th and 14th thresholds as in STEP 1815. If the variation is smaller than the 13th threshold, Ce=0. If the variation is larger than the 14th threshold, Ce=1. If the variation falls within the range between the 13th and 14th thresholds (both inclusive), Ce can be adaptively defined using:

$$Ce=(\text{variation}-\text{13th threshold})/(\text{14th threshold}-\text{13th threshold}) \quad (18)$$

<STEP 1818: Adjust Substitute Amount by Ce>

The CPU 11 adjusts the substitute amount $\Delta Cz$ calculated in STEP 1816 by the substitute level Ce defined in STEP 1817. The CPU 11 calculates the adjusted substitute amount $\Delta Ce$ using:

$$\Delta Ce = Ce \times \Delta Cz \quad (22)$$

By the process in STEP 1818, an edge area of a character or the like is relatively strongly substituted to enhance sharpness, and a flat area is relatively weakly substituted to prevent roughening.

<STEP 1819: Substitution Process>

The CPU 11 calculates a pixel value Nc of interest edge-emphasized by means of filtering and substitution by adding the substitute amount $\Delta Ce$ calculated in STEP 1818 to the edge emphasis filter-processed value Ne of the pixel of interest, as given by:

$$Nc = Ne + \Delta Ce \quad (23)$$

Note that a process for clipping Nc within a desired range may be inserted.

As described above, by applying the measurement of the variation time count to the substitution processing, variations caused by scanning can be appropriately adjusted, and parameters that reflect such adjusted results are defined, thus efficiently applying the substitution process. The substitution process can prevent overshoot and undershoot that may cause bordering near the edge when the edge emphasis filter is used, and effectively works for a text area. Furthermore, since the continuous substitution processes are adopted, jaggyness of the edge area that normally poses a problem in the substitution process can be avoided.

[Fifth Embodiment]

The aforementioned second and third embodiments have exemplified the edge emphasis process using the filter as the image adjusting process. By contrast, this embodiment calculates the amount of processing to be applied in the adjusting process from the number of zero-crossing points. That is, the variation time count represents a frequency, and it is particularly effective to use this for the process of a text area. Hence, this embodiment executes an achromatization process as the adjusting process effective as that for a text area.

(Achromatization Process)

Upon scanning a black character by the scanning unit, R, G, and B do not always assume the same values. As a result, a black density drop and an increase in saturation occur, thus posing a cause of quality deterioration. The achromatization process defines R, G, and B values to be closer to each other, and the level of the achromatization process will be referred to as an achromatization level hereinafter.

Figure 20:
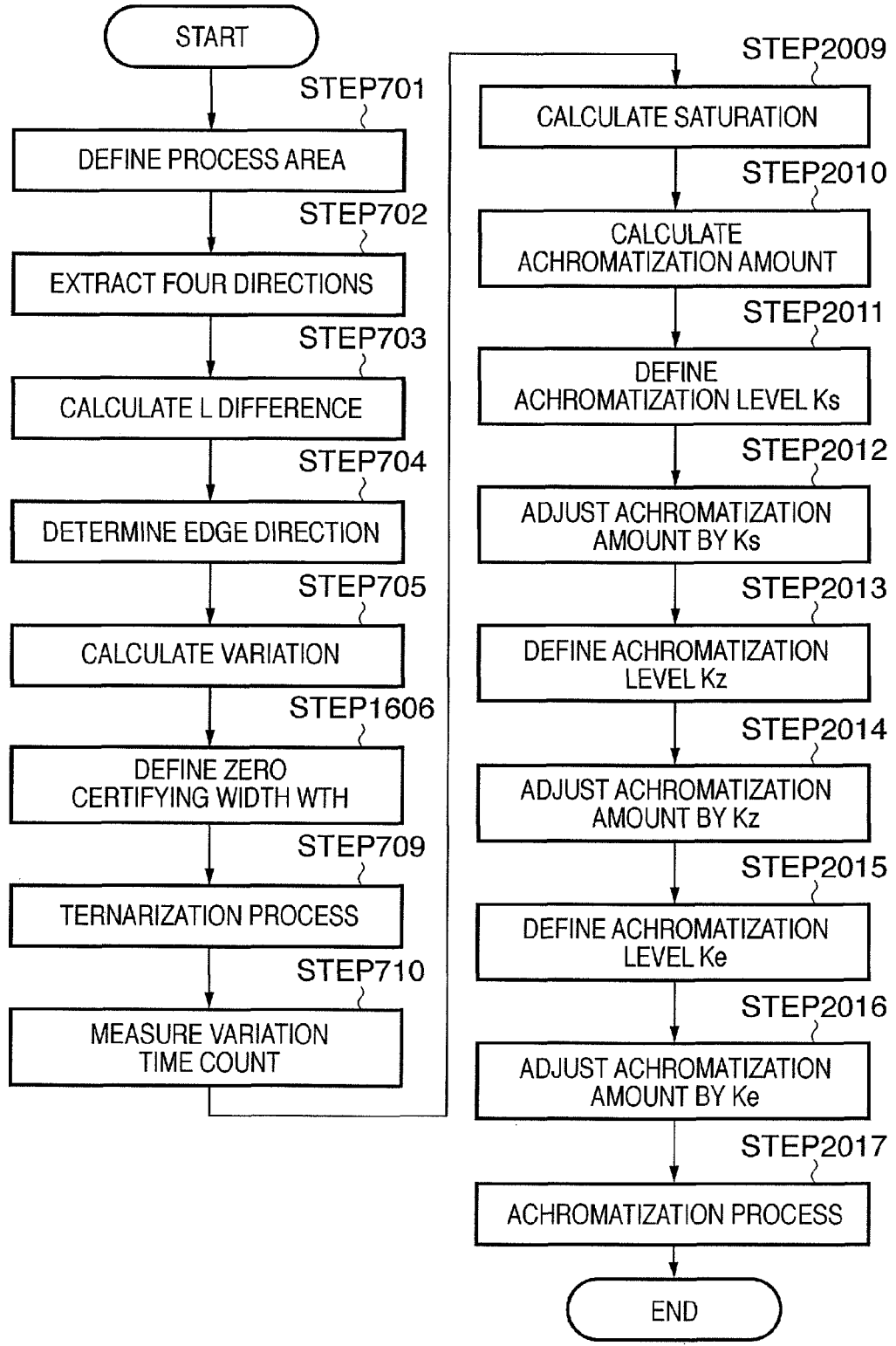
FIG. 20 is a flowchart of an achromatization process in another embodiment.

FIG. 20 is a flowchart showing the procedure of the achromatization process. Note that some processes are the same as in FIG. 16 of the third embodiment. Hence, the same step numbers denote the same processes, and a description thereof will not be repeated.

<STEP 2009: Calculate Saturation>

The CPU 11 calculates a saturation for the pixel of interest of the 7×7 RGB areas defined in STEP 701. The CPU 11 calculates color average values of 3×3 areas having the pixel of interest as the center. Let AR, AG, and AB be the average values of R, G, and B. Then, the CPU 11 calculates, as a saturation, a maximum value of |AR−AG|, |AG−AB|, and |AB−AR|. Note that the present invention is not limited to such specific saturation calculation method. In this case, the saturation is calculated from the averages of the 3×3 areas, but it may be calculated from areas within the process area size defined in STEP 701. This embodiment calculates the color space based on RGB. Alternatively, a block may be converted into a luminance color difference space, and the saturation may be calculated as a distance from the luminance axis using color difference components.

<STEP 2010: Calculate Achromatization Amount>

The CPU 11 calculates an achromatization amount $\Delta K$ using the average values AR, AG, and AB calculated in STEP 2009 from:

$$\Delta K = AG - AP \quad (27)$$

where AP is either AR or AB.

<STEP 2011: Define Achromatization Level Ks>

Figure 21A:
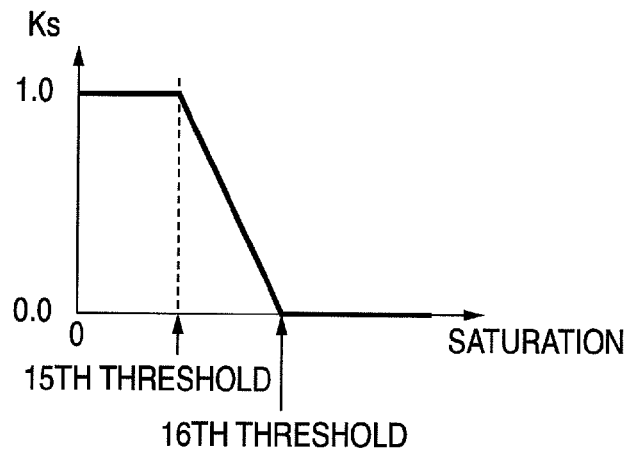
FIGS. 21A to 21C are graphs for explaining an achromatization level defining process.

The CPU 11 adaptively defines an achromatization level Ks in accordance with the saturation calculated in STEP 2009. FIG. 21A is a graph for explaining the Ks defining process in STEP 2011: the abscissa plots the saturation, and the ordinate plots Ks. In case of the saturation which is near the luminance axis and is smaller than a 15th threshold, Ks is defined to be 1 to achromatize the pixel of interest. The reason why the pixel near the luminance axis is achromatized is that a document is more likely to be achromatic since that pixel value is close to the luminance axis. In case of the saturation which is separated away from the luminance axis and is larger than a 16th threshold, Ks is defined to be zero so as not to achromatize the pixel. This is because that pixel is more likely to be a color pixel. In case of the saturation falling within the range between the 15th and 16th thresholds (both inclusive), different Ks is adaptively defined for each saturation to have Ks=1 when the saturation=the 15th threshold and Ks=0 when the saturation=the 16th threshold, so as to obscure switching of the processes. More specifically, the CPU 11 can adaptively define Ks with reference to FIG. 21A or using:

$$Ks = (\text{16th threshold} - \text{saturation})/(\text{16th threshold} - \text{15th threshold}) \quad (24)$$

<STEP 2012: Adjust Achromatization Amount by Ks>

The CPU 11 adjusts the achromatization amount $\Delta K$ calculated in STEP 2010 by the achromatization level Ks defined in STEP 2011. The CPU 11 calculates the adjusted achromatization amount $\Delta Ks$ using:

$$\Delta Ks = Ks \times \Delta K \quad (28)$$

By the process in STEP 2012, an image signal near the luminance axis can be closer to the luminance axis.

<STEP 2013: Define Achromatization Level Kz>

Figure 21B:
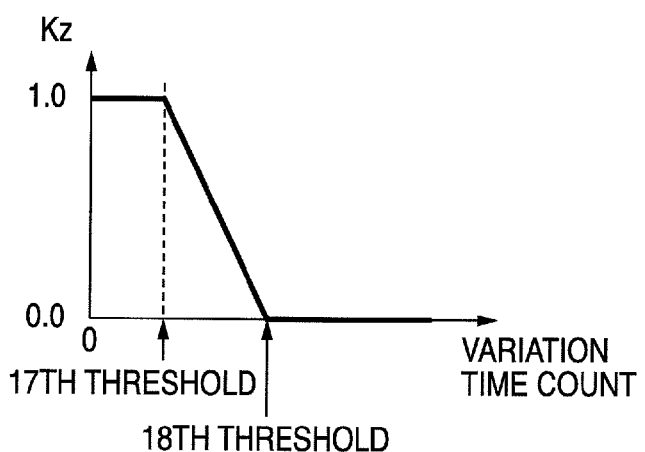

The CPU 11 adaptively defines an achromatization level Kz in accordance with the variation time count calculated in STEP 2010. The CPU 11 adaptively defines Kz based on characteristics shown in FIG. 21B using 17th and 18th thresholds as in STEP 2011. If the variation time count is smaller than the 17th threshold, Kz=1. If the variation time count is larger than the 18th threshold, Kz=0. If the variation time count falls within the range between the 17th and 18th thresholds (both inclusive), Kz can be adaptively defined using:

$$Kz = (\text{18th threshold} - \text{variation time count})/(\text{18th threshold} - \text{17th threshold}) \quad (25)$$

<STEP 2014: Adjust Achromatization Amount by Kz>

The CPU 11 adjusts the achromatization amount ΔKs calculated in STEP 2012 by the achromatization level Kz defined in STEP 2013. The CPU 11 calculates the adjusted achromatization amount ΔKz using:

$$\Delta Kz = Kz \times \Delta Ks \quad (29)$$

By the process in STEP 2014, relatively strong achromatization is applied to a text area with a smaller variation time count to blacken a character, and relatively weak achromatization is applied to halftone and photo areas with a larger variation time count to suppress a change in tint.

<STEP 2015: Define Achromatization Level Ke>

Figure 21C:
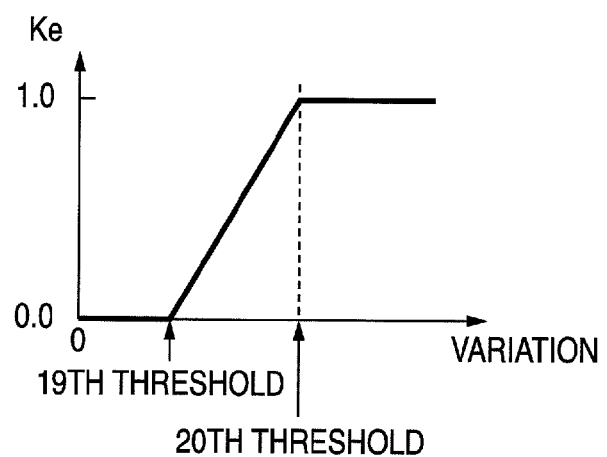

The CPU 11 adaptively defines an achromatization level Ke in accordance with the variation calculated in STEP 705. The CPU 11 adaptively defines Ke based on characteristics shown in FIG. 21C using 19th and 20th thresholds. If the variation is smaller than the 19th threshold/Ke=0. If the variation is larger than the 20th threshold, Ke=1. If the variation falls within the range between the 19th and 20th thresholds (both inclusive), Ke can be adaptively calculated using:

$$Ke = (\text{variation} - 19\text{th threshold})/(20\text{th threshold} - 19\text{th threshold}) \quad (26)$$

<STEP 2016: Adjust Achromatization Amount by Ke>

The CPU 11 adjusts the achromatization amount ΔKz calculated in STEP 2014 by the achromatization level Ke defined in STEP 2015. The CPU 11 calculates the adjusted achromatization level ΔKe using:

$$\Delta Ke = Ke \times \Delta Kz \quad (30)$$

By the process in STEP 2016, strong achromatization is applied to an edge area of a character to blacken the character, and weak achromatization is applied to an image with a relatively weak edge like a photo to suppress a change in tint.

<STEP 2017: Achromatization Process>

The CPU 11 calculates the pixel value of interest that has undergone the filter process, substitution process, and achromatization process by adding the achromatization amount ΔKe calculated in STEP 2016 to the pixel value of interest. Note that a process for clipping the calculated pixel value of interest within a desired range may be inserted.

As described above, according to this embodiment, since the measurement of the variation time count is applied to the achromatization process, variations caused by scanning can be appropriately adjusted, and parameters that reflect such adjusted results are defined, thus efficiently applying the achromatization process. The achromatization process can provide an effect with which a black character with a pixel value near the luminance axis has quality to gleam black.

In the fourth and fifth embodiments, the respective adjusting processes are independently executed for the sake of convenience. However, the three processes including the edge emphasis process of the third embodiment described previously may be executed in any combinations.

Other Embodiments

The embodiments of the present invention have been explained in detail. The present invention may be applied to either a system constituted by a plurality of devices, or an apparatus consisting of a single device.

Note that the present invention includes a case wherein the invention is achieved by directly or remotely supplying a program that implements the functions of the aforementioned embodiments to a system or apparatus, and reading out and executing the supplied program code by a computer of that system or apparatus. Therefore, the technical scope of the present invention includes the program code itself installed in a computer to implement the functional processes of the present invention using the computer.

In this case, the form of program is not particularly limited, and an object code, a program to be executed by an interpreter, script data to be supplied to an OS, and the like may be used as long as they have the program function.

As a recording medium for supplying the program, for example, a floppy® disk, hard disk, optical disk, and magneto-optical disk may be used. Also, MO, CD-ROM, CD-R, CD-RW, magnetic tape, nonvolatile memory card, ROM, DVD (DVD-ROM, DVD-R), and the like may be used.

As another use method, a connection is established to the Internet site using a browser of a client PC, and the program itself according to the present invention or a file that further includes an automatic installation function may be downloaded to a recording medium such as a hard disk or the like. Also, the program code that forms the program of the present invention may be segmented into a plurality of files, which may be downloaded from different homepages. That is, the present invention includes a WWW server which makes a plurality of users download a program required to implement the functional processes of the present invention by the computer. Furthermore, a storage medium such as a CD-ROM or the like, which stores the encrypted program of the present invention, may be delivered to the users. The user who has cleared a predetermined condition may be allowed to download key information that decrypts the program from a homepage via the Internet, and the encrypted program may be executed using that key information to be installed on a computer, thus implementing the present invention.

Moreover, the functions of the aforementioned embodiments can be implemented by some or all of actual processes executed by an OS or the like which runs on a computer based on instructions of the program.

In addition, the scope of the present invention includes a case in which the program according to the present invention is written in a memory of a function expansion unit of a PC, and a CPU equipped on that function expansion unit executes some or all of actual processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-180377, filed on Jun. 29, 2006, which is hereby incorporated by reference herein in its entirety.

What is claimed is:

1. An image processing apparatus which determines an attribute of an image including a pixel to be processed, said apparatus comprising:
   an extracting unit arranged to extract an image area having a predetermined size and including the pixel to be processed;
   a variation calculation unit arranged to
      calculate signal value differences between signal values of pixels in the image area, including the pixel to be processed, and
      calculate a variation of signal values from the calculated signal value differences;

an N-ary conversion unit arranged to convert the signal value differences into N-ary data (N being equal to or greater than three) by using at least one threshold corresponding to the variation calculated by said variation calculation unit; and a determination unit arranged to determine an attribute of the image area based on the N-ary data obtained by said N-ary conversion unit.

2. The apparatus according to claim 1, further comprising:
an adjusting level deciding unit arranged to decide an adjusting level associated with an image adjusting process from the variation; and an image correction unit arranged to execute the image adjusting process based on the adjusting level decided by said adjusting level deciding unit.

3. The apparatus according to claim 1, wherein said variation calculation unit
(i) extracts, in the image area, four pixel lines including the pixel to be processed,
(ii) calculates, in each pixel line, signal value difference between two pixels putting the pixel to be processed as a center,
(iii) specifies, from the four pixel lines, a pixel line having a largest absolute value of signal value difference, and
(iv) specifies, as the variation, the largest absolute value of signal value difference.

4. The apparatus according to claim 1,
wherein the N-ary data includes a plurality of values having zero as a center, and
wherein said determination unit determines the attribute of the image area by using a variation time count being the number of sign changes in the N-ary data converted by said N-ary conversion unit.

5. The apparatus according to claim 4, further comprising:
a variation time count calculation unit configured to calculate, as the variation time count, the number of sign changes in the N-ary data converted by said N-ary conversion unit,
wherein said determination unit determines the attribute of the image area by using the variation and the variation time count.

6. The apparatus according to claim 5,
wherein said N-ary conversion unit converts the signal value differences into ternary data indicating any of "−1", "0" and "1", by using a first threshold and a second threshold, and
wherein said variation time count calculation unit calculates, as the variation time count, a number of times that consecutive ternary data intersects with "0".

7. The apparatus according to claim 1, wherein the N-ary data is ternary data.

8. The apparatus according to claim 7, wherein said N-ary conversion unit
(i) specifies a first threshold and a second threshold,
(ii) specifies a larger difference between the first threshold and the second threshold when the variation is more than a predetermined value and a smaller difference when the variation is equal to or less than the predetermined value, and
(iii) converts the signal value differences between the first threshold and the second threshold into "0".

9. The apparatus according to claim 1, wherein the variation is a maximum value of the signal value differences of pixels surrounding the pixel to be processed.

10. The apparatus according to claim 5, wherein said determination unit
(i) determines the attribute of the image area as a halftone, when the variation time count is equal to or more than a third threshold,
(ii) determines the attribute of the image area as a thin line, when the variation time count is equal to or more than a fourth threshold and is less than the third threshold, and
(iii) determines the attribute of the image area as a bold character, when the variation time count is equal to or more than a fifth threshold and is less than the fourth threshold.

11. The apparatus according to claim 5, wherein said determination unit determines the attribute of the image area as a picture, when the variation time count is less than a fifth threshold.

12. An image processing method, which determines an attribute of an image including a pixel to be processed, said method comprising the steps of:
extracting an image area having a predetermined size and including the pixel to be processed;
calculating signal value differences between signal values of pixels in the image area, including the pixel to be processed, and calculating a variation of signal values from the calculated signal value differences;
converting the signal value differences into N-ary data (N being equal to or greater than three) by using at least one threshold corresponding to the variation calculated in said variation calculation step; and
determining an attribute of the image area based on the N-ary data obtained in said converting step.

13. A non-transitory computer-readable storage medium storing, in executable form, a program for causing a computer to implement an image processing method, which determines an attribute of an image including a pixel to be processed, said method comprising the steps of:
extracting an image area having a predetermined size and including the pixel to be processed;
calculating signal value differences between signal values of pixels in the image area, including the pixel to be processed, and calculating a variation of signal values from the calculated signal value differences;
converting the signal value differences into N-ary data (N being equal to or greater than three) by using at least one threshold corresponding to the variation calculated in said variation calculation step; and
determining an attribute of the image data based on the N-ary data obtained in said converting step.

14. An image processing apparatus comprising:
an extracting unit arranged to extract an image area having a predetermined size and including a pixel to be processed;
a variation calculation unit arranged to
calculate absolute values of signal value differences between signal values of pixels selected in the image area, and
acquire, as a variation of signal values, the largest absolute value of the calculated absolute values;
an N-ary conversion unit arranged to convert the signal value differences into N-ary data (N being equal to or more than three) by using at least two thresholds corresponding to the variation acquired by said variation calculation unit;
an adjusting level deciding unit arranged to decide an adjusting level of an adjusting process for the pixel to be processed based on the N-ary data; and an image correction unit arranged to execute an image correcting process for the pixel to be processed based on the adjusting level decided by said adjusting level deciding unit.

15. The apparatus according to claim 14, wherein the adjusting process includes at least one of an edge emphasis process using a filter, a substitution process, and an achromatization process.

* * * * *